United States Patent
Sethu et al.

(10) Patent No.: US 12,339,807 B2
(45) Date of Patent: Jun. 24, 2025

(54) METHOD AND SYSTEM FOR AUTOMATING ANALYSIS OF LOG DATA FILES

(71) Applicant: HCL Technologies Limited, New Delhi (IN)

(72) Inventors: Sasikala Sethu, Madurai (IN); Srinivas T, Hyderabad (IN)

(73) Assignee: HCL Technologies Limited, New Delhi (IN)

( * ) Notice: Subject to any disclaimer, the term of this patent is extended or adjusted under 35 U.S.C. 154(b) by 206 days.

(21) Appl. No.: 17/897,135

(22) Filed: Aug. 27, 2022

(65) Prior Publication Data

US 2023/0072123 A1   Mar. 9, 2023

(51) Int. Cl.
*G06F 16/16* (2019.01)
*G06N 5/02* (2023.01)

(52) U.S. Cl.
CPC .......... *G06F 16/162* (2019.01); *G06N 5/02* (2013.01)

(58) Field of Classification Search
CPC .............................. G06F 16/162; G06N 5/02
See application file for complete search history.

(56) References Cited

U.S. PATENT DOCUMENTS

| | | | | |
|---|---|---|---|---|
| 11,477,266 B1 * | 10/2022 | Paczkowski | ......... | H04W 76/11 |
| 11,520,602 B2 * | 12/2022 | Laskawiec | ........... | G06F 11/302 |
| 11,855,831 B1 * | 12/2023 | Nguyen | .............. | H04L 41/0627 |
| 12,095,628 B2 * | 9/2024 | Lukens | ................ | H04L 41/147 |
| 2017/0353991 A1 * | 12/2017 | Tapia | ................. | H04L 41/0631 |
| 2019/0065343 A1 * | 2/2019 | Li | ........................ | G06F 11/3608 |
| 2019/0213115 A1 * | 7/2019 | Takawale | ........... | G06F 11/3692 |
| 2019/0324831 A1 * | 10/2019 | Gu | ...................... | G06F 11/0775 |
| 2020/0204680 A1 * | 6/2020 | Prakash | ................. | G06N 20/00 |
| 2020/0250559 A1 * | 8/2020 | Dinh | ....................... | H04L 41/16 |
| 2020/0349133 A1 * | 11/2020 | Dwarampudi | ...... | G06F 16/2272 |
| 2020/0401397 A1 * | 12/2020 | Thomas | ................ | G06F 11/327 |
| 2021/0173750 A1 * | 6/2021 | Cameron | ........... | G06F 11/0766 |

(Continued)

FOREIGN PATENT DOCUMENTS

| | | |
|---|---|---|
| WO | 2017214271 A1 | 12/2017 |
| WO | 2019092567 A1 | 5/2019 |

OTHER PUBLICATIONS

Rama Akkiraju, Watson AIOps: Bringing AI to IT Operations Management, Dec. 16, 2020.

*Primary Examiner* — Mark E Hershley
(74) *Attorney, Agent, or Firm* — Kendal M. Sheets

(57) ABSTRACT

A method and system for automating analysis of log data files is disclosed. In some embodiments, the method includes pre-processing a log data file to generate a transformed log data file. The method further includes analyzing the transformed log data file to detect one or more of a plurality of anomalies in the transformed log data file; performing a predictive analysis for the one or more of the plurality of anomalies detected in the transformed log data file. The method further includes generating a report based on the predictive analysis performed for each of the one or more of the plurality of anomalies; receiving a feedback from an end-user based on the report generated for each of the one or more of the plurality of anomalies; and updating a database based on the feedback from the end-user for each of the one or more of the plurality of anomalies.

13 Claims, 17 Drawing Sheets

(56) References Cited

U.S. PATENT DOCUMENTS

| | | | |
|---|---|---|---|
| 2021/0303381 A1* | 9/2021 | Baldassarre | G06N 5/04 |
| 2021/0366106 A1* | 11/2021 | Yao | G06F 21/6254 |
| 2021/0383170 A1* | 12/2021 | Alshawabkeh | G06F 18/24323 |
| 2022/0147507 A1* | 5/2022 | Bogdanowicz | G06F 11/3636 |

* cited by examiner

| ANALYZE LOG | ANAMOLY IDENTIFICATION | ERROR FIX RECOMMENDATION | MODEL BUILDER | DATA MANAGER |
|---|---|---|---|---|

CPS - Log Analytics Tool — 1300A

Last Generated Reports: View Anomaly Report   View Error Fix Report

Log Details

Upload: [Choose Files] No file chosen  [Upload]

From: [mm/dd/yyyy] 📅   To: [mm/dd/yyyy] 📅   [Analyze Logs]

| S.no 1302A | File Name 1304A | Date Uploaded 1306A | Status 1308A | Anamoly Count 1310A | Error Count 1312A |
|---|---|---|---|---|---|
| 1 | 2020-10-15113936_6960073 | 2020-10-15 11:39:36 | | | |
| 2 | 2020-10-15113825_6960073 | 2020-10-15 11:38:25 | | | |
| 3 | 2020-07-24130942_6960073.csv_structured.csv | 2020-07-24 13:09:42 | | | |
| 4 | 2020-07-24122042_31730.log_structured.csv | 2020-07-24 12:20:42 | Processed | 32.0 | 1.0 |
| 5 | 2020-07-24122042_27737.log_structured.csv | 2020-07-24 12:20:42 | Processed | 0.0 | 2.0 |

FIG. 13A

| Analyze Log | | ERROR FIX RECOMMENDATION | | MODEL BUILDER | DATA MANAGER |
|---|---|---|---|---|---|
| S# 1302B | Level 1304B | ANAMOLY IDENTIFICATION | | Anomaly-Possible Cause 1308B | Action 1310B |
| | | log Message 1306B | | | |
| 11 | | Failed to connect to nd2bwa3psm14vb:27737 - NetworkInterfaceExceededTimeLimit: Operation timed-out | | Mongo DB Node Connectivity Error, member is not reachable/not available | ⟳ |
| 12 | I | Failed to connect to nd2bwa3psm14vb:27737 - HostUnreachable: No route to host | | Mongo DB Node Connectivity Error, member is not reachable/not available | ⟳ |
| 13 | I | Error in heartbeat (requestId: 7644108) in nd2bwa3psm14vb:27737, response status: HostUnreachable: Connection refused | | Mongo DB Node Connectivity Error, member is not reachable/not available | ⟳ |
| 14 | I | Error in heartbeat (requestId: 7807110) to nd2bwa3psm14vb:27737, response status: HostUnreachable: No route to host | | Mongo DB Node Connectivity Error, member is not reachable/not available | ⟳ |
| 15 | I | Successfully connected to nd2bwa3psm14va:27737, took 1ms (3 connections now open to nd2bwa3psm14va:27737) | | | ⟳ |
| 16 | W | two remote primaries (transiently) | | abnormal scenario | ⟳ |
| 17 | I | Choosing new sync source because the most recent OpTime of our sync source, nd2bwa3psm14vb:27737, is { ts: Timestamp(1589392787, 2728), t: -1} which is more than 30s behind member nd2bwa3psm14va:27737 whose most recent OpTime is { ts: Timestamp(1589392818, 770), t: -1} | | | ⟳ |
| 18 | I | Cancelling oplog query due to ReplSetMetadata. We have to choose a new sync source. Current source: nd2bwa3psm14va:27737, OpTime { ts: Timestamp(0,0), t: -1}, its sync source index: -1 | | | ⟳ |
| 19 | W | Fetcher stopped querying remote oplog with error: InvalidSyncSource: sync source nd2bwa3psm14va:27737 (config version: -1; last visible optime: { ts: Timestamp(0,0), t: -1 }; sync source index: -1; primary index: -1) is no longer valid | | | ⟳ |

FIG. 13B

| S# 1302B | Analyze Log | Level 1304B | ANOMALY IDENTIFICATION Log Message 1306B | ERROR FIX RECOMMENDATION | MODEL BUILDER Anomaly-Possible Cause 1308B | DATA MANAGER Action 1310B |
|---|---|---|---|---|---|---|
| 11 | | I | Failed to connect to rd2bwa3psm14va:27737 - NetworkInterfaceExceededTimeLimit: Operation | | Mongo DB Node Connectivity Error. member is not reachable/not available | ⊘ |
| 12 | | I | Failed to connect to rd2bwa3psm14va:27737 - HostUnreachab | | Mongo DB Node Connectivity Error. | ⊘ |
| 13 | | I | Error in heartbe rd2bwa3psm14 Connection refu | Error Identifier:b20d4681 Log Message Member rd2bwa3psm14va:27737 is now in state SECONDARY | | ⊘ |
| 14 | | I | Error in heartbe rd2bwa3psm HostUnreachabl | Possible Cause Exclude Data Mark it as Not Anomaly. | member is not available | ⊘ |
| 15 | | I | Successfully co took 1ms (3 co rd2bwa3psm14 | ☐ Yes ☐ Yes | | ⊘ |
| 16 | | W | two remote prim | Close Save | member is not available | ⊘ |
| 17 | | I | Choosing new s our sync sourc Timestamp(158 behind member OpTime is { ts: | Cancelling oplog query due to ReplSetMetadata. We have to choose a new sync source. Current source: rd2bwa3psm14va:27737, OpTime { ts: Timestamp(0,0), t: -1 }, its sync source index:-1 | | ⊘ |
| 18 | | I | | Fetcher stopped querying remote oplog with error: InvalidSyncSource: sync source rd2bwa3psm14va:27737 (config version: -1; last visible optime: { ts: Timestamp(0,0), t: -1 }; sync source index: -1; primary index: -1) is no longer valid | | ⊘ |
| 19 | | W | | | | ⊘ |

| | Analyze Log | | ANAMOLY IDENTIFICATION | | ERROR FIX RECOMMENDATION | | | MODEL BUILDER | DATA MANAGER | |
|---|---|---|---|---|---|---|---|---|---|---|
| | Level 1302D | log Message 1304D | Error Component 1306D | Predicted Error Category 1308D | Error Category Score 1310D | Predicted Possible Cause 1312D | Possible Probability Score 1314D | Recommended Fix 1316D | Solution Probability 1318D | Update Results 1320D |
| | W | two remote primaries (transiently) | mongodb | rare case scenario, occurs due to network interruption | 1.0 | In some circumstances, two nodes in a replica set may transiently believe that they are the primary, but at most, one of them will be able to complete writes with { w: "majority" } write concern. The node that can complete ( w: "majority" ) writes is the current primary, and the other node is a former primary that has not yet recognized its demotion, typically due to a network partition. When this occurs, clients that connect to the former primary may observe stale data despite having requested read preference primary, and new writes to the former primary will eventually roll back. | 1.0 | Contact the SME | 1.0 | ⊙ |
| | W | Fetcher stopped querying remote oplog with error: InvalidSyncSource sync source nd2bwa3psm14va: 27737 (config version: -1: | mongodb | member not in sync with other | 1.0 | 1) The reported node may not be reachable from the primary and the other nodes that are defined in | 1.0 | 1) Open the mongo config file "mongo.cfg", check if the reported session manager node is configured to the correct replica set. 2) Restart the mongo db server | 1.0 | ⊙ |

1300D

| ANALYZE LOG | ANAMOLY IDENTIFICATION | ERROR FIX RECOMMENDATION | MODEL BUILDER | DATA MANAGER |
|---|---|---|---|---|

Log Details

Upload File: [Choose Files] No file chosen

File Components

[Upload]   [Self Error Learning]   [Build Anamoly Model]

| File Name | File Component | Date |
|---|---|---|
| 2020-07-15 080348_2020-06-30012640_mongodb-27717.log | | 2020-07-15 08:03:48 |

FIG. 13F

METHOD AND SYSTEM FOR AUTOMATING ANALYSIS OF LOG DATA FILES

TECHNICAL FIELD

Generally, the invention relates to log data files. More specifically, the invention relates to method and system for automating analysis of log data files.

BACKGROUND

Currently, many organizations maintain log data files of their applications, databases, network devices, servers, and other system. These log data files include critical information about user's, traffic, configuration, performance, and security related aspects of their distributed environment. Moreover, these log data files are often very large having complex structure. Although, process of creating log data files is very easy and uncomplicated but analysing log data files may be a tedious task and may require a large number of computational resources and sophisticated processes. Moreover, the process of analyzing these log data files may be time consuming and challenging.

Due to above listed reasons, many applications have been developed that may generate execution sequence, errors, warnings in the log data files at the time of execution. These log data files may be used to investigate and debug whenever an issue is raised, as a developer would not have direct access to environment. However, analysing the issues may be a very critical process as most of the reported issues are investigated by analyzing the log data files. Moreover, since volume of the log data files are huge in size, it becomes challenging for developers to walkthrough these log data files and investigate a root cause of issues reported in the log data files. Currently, developers use grep tools to search for log data with errors present in the log data files, filter log data for specific date and time across multiple log data files and then manually analyze the log data files to identify the errors. Once, the errors are identified and the root cause behind the errors are determined, then the determined root cause are further analyzed in order to fix the errors.

However, manual analysis of the errors and the root cause may be a lengthy and time consuming process. In addition, the developers may require more domain and technical expertise in order to determine the root cause and fix the errors. This human driven remediation can be inconsistent and time consuming due to the turnaround time, thereby putting bug (i.e., the issues) fixing productivity at risk. Due to the above listed reasons, Information Technology (IT) industries are constantly looking forward for innovative solutions to reduce efforts and time required to analyze the log data files in short duration with less dependency on the developers.

Therefore, there is a need of an efficient and reliable method and system for automating analysis of log data files.

SUMMARY OF INVENTION

In one embodiment, a method for automating analysis of log data files is disclosed. The method may include pre-processing a log data file to generate a transformed log data file. It should be noted that, the log data file comprises a set of data files in one a plurality of data formats. The method may include analyzing the transformed log data file to detect one or more of a plurality of anomalies in the transformed log data file. It should be noted that, the one or more of the plurality of anomalies is detected by identifying one of a new and abnormal behavior associated with the transformed log data file. The method may include performing a predictive analysis for the one or more of the plurality of anomalies detected in the transformed log data file. It should be noted that, the predictive analysis is performed based on a set of factors and a confidence score associated with each of the set of factors. The method may include generating a report based on the predictive analysis performed for each of the one or more of the plurality of anomalies. The method may include receiving a feedback from an end-user based on the report generated for each of the one or more of the plurality of anomalies. It should be noted that, the end-user provides the feedback based on a pre-configured threshold value. The method may include updating a database based on the feedback from the end-user for each of the one or more of the plurality of anomalies.

In another embodiment, a system for automating analysis of log data files is disclosed. The system includes a processor and a memory communicatively coupled to the processor. The memory may store processor-executable instructions, which, on execution, may causes the processor to pre-process a log data file to generate a transformed log data file. It should be noted that, the log data file comprises a set of data files in one a plurality of data formats. The processor-executable instructions, on execution, may further cause the processor to analyze the transformed log data file to detect one or more of a plurality of anomalies in the transformed log data file. It should be noted that, the one or more of the plurality of anomalies is detected by identifying one of a new and abnormal behavior associated with the transformed log data file. The processor-executable instructions, on execution, may further cause the processor to perform a predictive analysis for the one or more of the plurality of anomalies detected in the transformed log data file. It should be noted that, the predictive analysis is performed based on a set of factors and a confidence score associated with each of the set of factors. The processor-executable instructions, on execution, may further cause the processor to generate a report based on the predictive analysis performed for each of the one or more of the plurality of anomalies. The processor-executable instructions, on execution, may further cause the processor to receive a feedback from an end-user based on the report generated for each of the one or more of the plurality of anomalies. It should be noted that, the end-user provides the feedback based on a pre-configured threshold value. The processor-executable instructions, on execution, may further cause the processor to update a database based on the feedback from the end-user for each of the one or more of the plurality of anomalies.

In yet another embodiment, a non-transitory computer-readable medium storing computer-executable instruction for automating analysis of log data files is disclosed. The stored instructions, when executed by a processor, may cause the processor to perform operations including pre-processing a log data file to generate a transformed log data file. It should be noted that, the log data file comprises a set of data files in one a plurality of data formats. The operations may further include analyzing the transformed log data file to detect one or more of a plurality of anomalies in the transformed log data file. It should be noted that, the one or more of the plurality of anomalies is detected by identifying one of a new and abnormal behavior associated with the transformed log data file. The operations may further include performing a predictive analysis for the one or more of the plurality of anomalies detected in the transformed log data file. It should be noted that, the predictive analysis is performed based on a set of factors and a confidence score associated with each of the set of factors. The operations may further include generating a report based on the predictive analysis performed for each of the one or more of the plurality of anomalies. The operations may further include receiving a feedback from an end-user based on the report generated for each of the one or more of the plurality of anomalies. It should be noted that, the end-user provides the feedback based on a pre-configured threshold value. The operations may further include updating a database based on the feedback from the end-user for each of the one or more of the plurality of anomalies.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIGS. 13A-13F illustrate exemplary representation of an AI based log analyzer used to perform automatic analysis of log data files, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
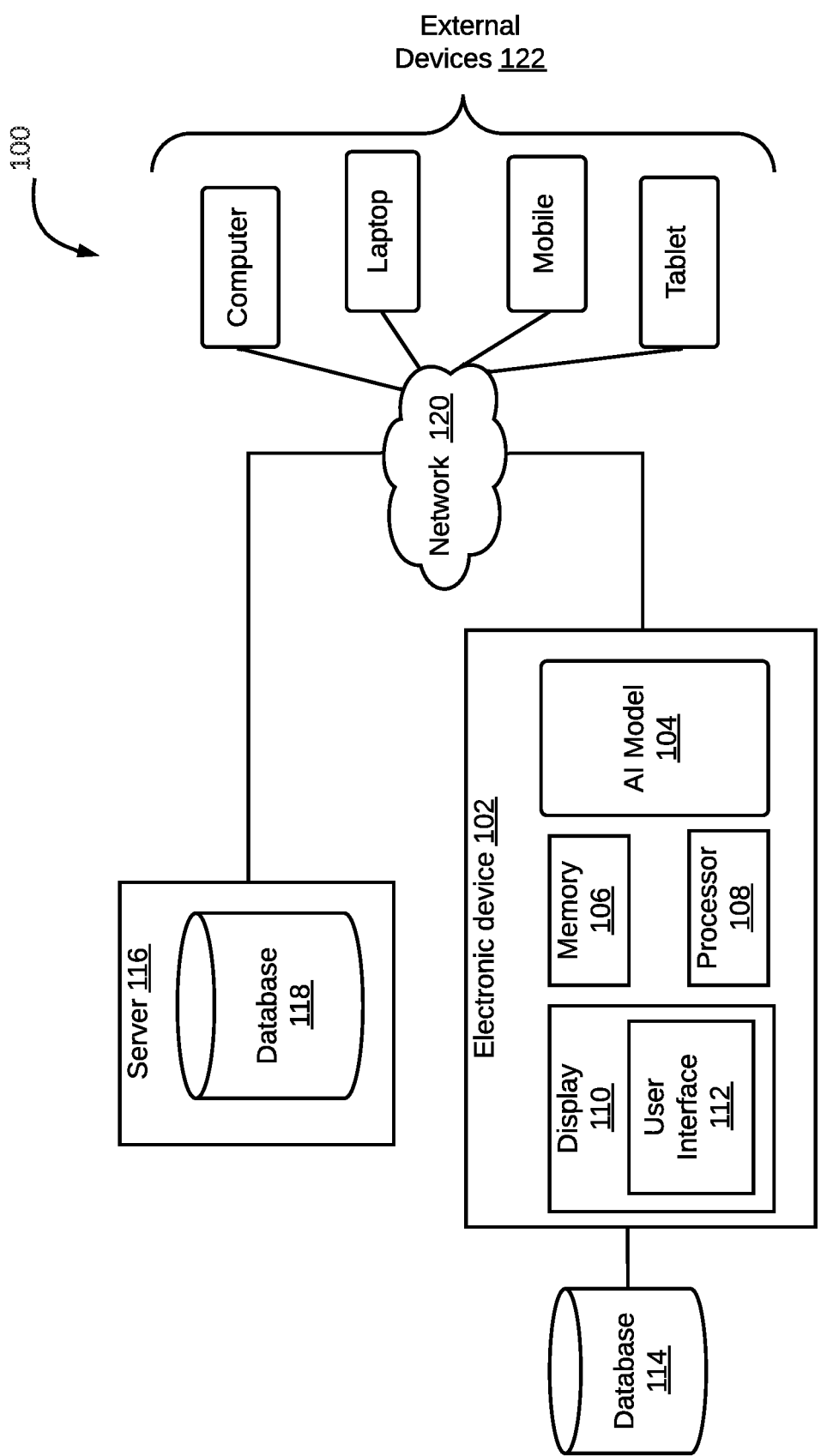
FIG. 1 illustrates a system for automating analysis of log data files, in accordance with an embodiment.

A system 100 for automating analysis of log data files, is illustrated in FIG. 1. The log data files may also be referred to as log files. In particular, the system 100 may include an electronic device 102 that may perform analysis of a log data file. It should be noted that, for ease of explanation analysis performed for one log data file is explained. However, analysis can be performed for any number of log data files having different formats at once. In an embodiment, the electronic device 102 configured for automating analysis of the log data file may correspond to an Artificial Intelligence (AI) based log analyzer. The AI based log analyzer may be an intellectual tool incorporating human intelligence to analyze the log data file for anomalies and errors. Further, the electronic device 102 may be include an AI model 104. In order to perform analysis of the log data file, initially, an end-user may upload the log data file to be analyzed. In order to upload the log data file, the end-user may login using his user credentials via the electronic device 102. The login credentials may include, but is not limited to, a username and a password. In an embodiment, the end-user may correspond to an engineer or a developer responsible for performing analysis of the log data file.

Once the log data file is uploaded by the end-user, the AI model 104 of the electronic device 102 may be configured to pre-process the log data file. The log data file may be pre-processed in order to generate the transformed log data file. In an embodiment, the log data file may include a set of data files in one of a plurality of data formats. Examples of the plurality of data formats may include, but is not limited to, National Center for Supercomputing Application (NCSA) common log format, World Wide Web Consortium (W3C) extended, Sun™ ONE Web Server (iPlanet), WebSphere Application Server Logs., File Transfer Protocol (FTP) logs, and Custom Log File Format. A method of pre-processing the log data file has been further explained in greater detail in conjunction to FIG. 5 and FIG. 6.

Once the transformed log data file is generated, the AI model 104 may be configured to analyze the transformed log data file. The transformed log data file may be analyzed in order to detect one or more of a plurality of anomalies in the transformed log data file. In an embodiment, the one or more of the plurality of anomalies may be detected by identifying one of a new and abnormal behavior associated with the transformed log data file. Further, the AI model 104 may be configured to perform a predictive analysis for the one or more of the plurality of anomalies detected in the transformed log data file.

In an embodiment, the predictive analysis is performed based on a set of factors and a confidence score associated with each of the set of factors. The set of factors may include, but is not limited to number of errors generated, category of each of the number of errors generated, root cause associated with each of the number of errors generated, and a set of possible solutions associated with each of the number of errors generated. A process of performing the predictive analysis has been further explained in greater detail in conjunction to FIG. 7-FIG. 9.

Based on the predictive analysis performed, the AI model 104 may be configured to generate a report. The report may be generated based on predictive analysis performed for each of the one or more of the plurality of anomalies. Once, the report is generated, the AI model 104 may receive a feedback from the end-user based on the report generated for each of the one or more of the plurality of anomalies. In an embodiment, the end-user may provide the feedback based on a pre-configured threshold value. Based on the feedback received from the end-user, the AI model 104 may be configured to update a database 114 connected to the electronic device 102. A process of receiving the feedback and updating of the database 114 has been further explained in greater detail in conjunction to FIG. 10 and FIG. 12. Moreover, this complete process followed by the system 100 is further explained in detail in conjunction with FIG. 2 to FIG. 13.

Examples of the electronic device 102 may include, but are not limited to, a server, a desktop, a laptop, a notebook, a tablet, a smartphone, a mobile phone, an application server, or the like. The electronic device 102 may further include a memory 106, a processor 108, and a display 110. The display 110 may further include the user interface 112. The end-user may interact with the electronic device 102 and vice versa through the display 110.

By way of an example, the display 110 may be used to display results (i.e., the transformed log data file generated, the one or more of the plurality of anomalies detected, the report generated based on the predictive analysis performed, etc.) based on actions performed by the electronic device 102, to the end-user (i.e., the engineer or the developer responsible for analysing the log data file). Moreover, the display 110 may be used to display the set of possible solutions recommended to the end-user based on the root cause identified for each of a set of errors. The set of possible solution may change based on a new log data file uploaded for analysis. In addition, the display 110 may be used to display an option provided to the end-user to select or reject each of the set of possible solutions.

By way of another example, the user interface 112 may be used by the end-user to provide inputs to the electronic device 102. Thus, for example, in some embodiment, the electronic device 102 may ingest an input that includes a user selection of at least one of the set of possible solutions recommended to the end-user. Further, for example, in some embodiments, the electronic device 102 may render intermediate results (e.g., the transformed log data file, the one or more of the plurality of anomalies detected, the set of errors identified, the root cause associated with each of the set of errors) or final results (e.g., the report generated based on the predictive analysis performed) to the user via the user interface 112.

The memory 106 may store instructions that, when executed by the processor 108, may cause the processor 108 to perform automatic analysis of the log data file. The processor 108 may perform automatic analysis of the log data file received from the end-user, in accordance with some embodiments. As will be described in greater detail in conjunction with FIG. 2 to FIG. 13, in order to perform the automatic analysis of the log data file, the processor 108 in conjunction with the memory 106 may perform various functions including pre-processing of the log data file, analysis of the transformed log data file, the predictive analysis performed for the one or more of the plurality of anomalies detected, generation of the report, receiving of the feedback, updating of the database 114, etc.

The memory 106 may also store various data (e.g. the transformed log data file, the one or more of the plurality of anomalies detected, the report generated, the set of possible solutions recommended, the feedback received from the end-user, etc.) that may be captured, processed, and/or required by the electronic device 102. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the database 114 connected to the electronic device 102 may be used to store the feedback received from the end-user for each of the one or more of the plurality of anomalies. In addition, the database 114 may store results generated based on analysis performed for the log data file. Additionally, the database 114 may be periodically updated based on the one or more of the plurality of anomalies detected, and the acceptance or rejection of the each of the set of possible solutions recommended to the end-user.

Further, the electronic device 102 may interact with a server 116 or external devices 122 over a network 120 for sending and receiving various data. The external devices 122 may be used by a plurality of users (i.e., the end-users) to provide their selection of the set of possible solutions recommended by the electronic device 102. The network 120, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiment, the electronic device 102 may fetch information associated with the log data file from the server 116. In addition, the server 116 may provide access of the information associated with the log data file to the plurality of users. The server 116 may further include a database 118. The database 118 may store information associated with the log data file. By way of an example, the database 118 may store the information associated with the log data file in order to identify the one of the plurality of formats associated with each of the set of data files included in the log data file. The database 118 may be periodically update with a new error or a new format determined for one of the set of data files. Alternatively, the electronic device 102 may receive the feedback from the end-user from one of the external devices 122.

Figure 2:
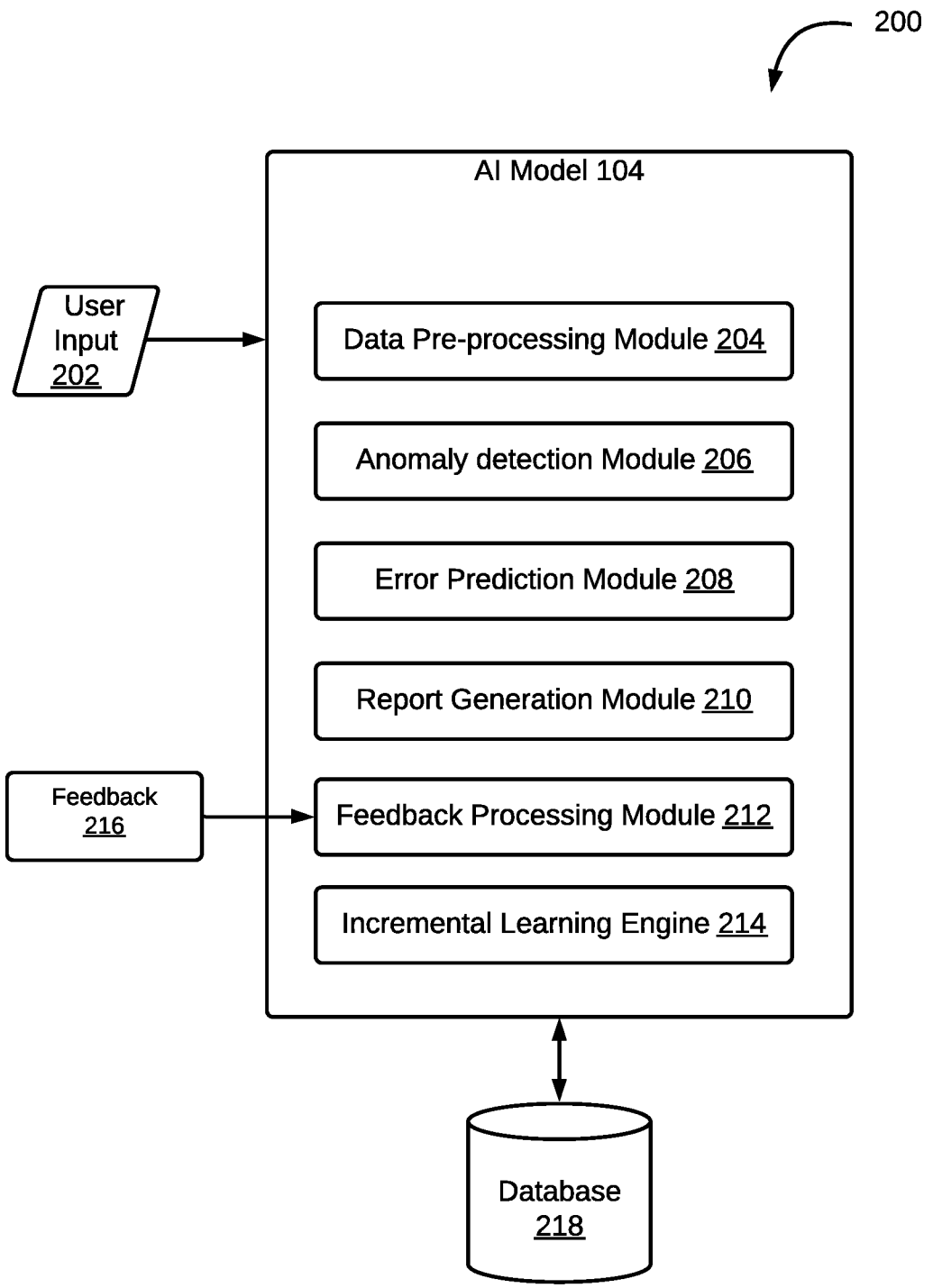
FIG. 2 illustrates a functional block diagram of an Artificial Intelligence (AI) model within an electronic device configured to automate analysis of log data files, in accordance with an embodiment.

Referring now to FIG. 2, a functional block diagram 200 of the AI model 104 within the electronic device 102 configured to automate analysis of log data files is illustrated, in accordance with an embodiment. Initially, a log data file may be received as a user input 202 from at least one of the external devices 122 by the AI model 104. The log data file may include a set of data files in one a plurality of data formats. Examples of the plurality of data formats may include, but is not limited to, National Center for Super-cornputing Application (NCSA) common log format, World Wide Web Consortium (W3C) extended, Sun™ ONE Web Server (iPlanet), WebSphere Application Server Logs., File Transfer Protocol (FTP) logs, and Custom Log File Format.

In an embodiment, the AI model 104 may include a data pre-processing module 204, an anomaly detection module 206, an error prediction module 208, a report generation module 210, a feedback processing module 212, and an incremental learning engine 214. In addition to the above mentioned modules, the AI model 104 of the electronic device 102 may be connected to a database 218. The modules 204-214 may include routines, programs, objects, components, data structures, etc., which perform particular tasks or implement particular abstract data types. The modules 204-214 described herein may be implemented as software modules that may be executed in a cloud-based computing environment of the electronic device 102.

The data pre-processing module 204 may be configured to receive the user input 202. The user input 202 may correspond to the log data file. The log data file may include the set of data files in one the plurality of data formats. Upon receiving the log data file, the data pre-processing module 204 may be configured to clean junk data from the log data file. The junk data from the log data file may be cleaned to generate a clean log data file. In an embodiment, the clean log data file may be generated by clustering each of a set of similar data files from the set of data files in one the plurality of data formats. Further, the data pre-processing module 204 may be configured to structure the clean log data file to generate a structured log data file. The structuring of the log data file may be done using a drain algorithm. Moreover, the data pre-processing module 204 may be configured to transform the structured log data file to generate the transformed log data file. Once the transformed log data file is generated, the data pre-processing module 204 may be configured to send the transformed log data file to the anomaly detection module 206.

The anomaly detection module 206 may be configured to receive the transformed log data file from the data pre-processing module 204. Upon receiving the transformed log data file, the anomaly detection module 206 may be configured to analyze the transformed log data file. The transformed log data file may be analyzed by the anomaly detection module 206, in order to detect one or more of the plurality of anomalies. Once the one or more of the plurality of anomalies are detected, the anomaly detection module 206 may be configured to generate an anomaly report for the one or more of the plurality of anomalies detected. In one embodiment, the anomaly detection module 206 may be configured to send the one or more of the plurality of anomalies detected in the transformed log data file along with the transformed log data file to the error prediction module 208. In another embodiment, the anomaly detection module 206 may be configured to send the one or more of the plurality of anomalies detected in the transformed log data file to the report generation module 210.

The error prediction module 208 may be configured to receive the one or more of the plurality of anomalies detected in the transformed log data file along with the transformed log data file from the anomaly detection module 206. Further, the error prediction module 208 may be configured identify the set of errors in the transformed log data file. The set of errors in the transformed log data file is identified based on the one or more of the plurality of anomalies detected in the transformed log data file. Moreover, the error prediction module 208 may be configured to classify each of the set of errors in one of a plurality of error categories. In addition, the error prediction module 208 may be configured to identify the root cause associated with each of the set of errors. Based on the root cause predicted, the error prediction module 208 may be configured to recommend the set of possible solutions for the identified root cause associated with each of the set of errors. Further, the error prediction module 208 may be configured to generate the confidence score for each of the set of errors, the root cause associated with each of the set of errors, and each of the set of possible solutions. The error prediction module 208 may send the set of errors, the root cause associated with the set of errors, the set of possible solutions recommended, and the generated confidence score to the report generation module 210.

In one embodiment, the report generation module 210 may be configured to receive the one or more of the plurality of anomalies detected in the transformed log data file from the anomaly detection module 206. Based on the one or more of the plurality of anomalies received, the report generation module 210 may be configured to generate a report (also referred as anomaly report). Further, the generated anomaly report may be displayed to the end-user. In addition, the generated anomaly report may be sent to the feedback processing module 212.

In another embodiment, the report generation module 210 may be configured to receive the set of errors, the root cause associated with the set of errors, the set of possible solutions recommended, and the generated confidence score from the error prediction module 208. Further, the report generation module 210 may be configured to generate the report based on the predictive analysis performed by the error prediction module 208. In other words, the report generation module 210 may be configured to generate the report based on the set of errors, the root cause associated with the set of errors, the set of possible solutions recommended, and the generated confidence score. In an embodiment, the confidence score for each of the set of errors, the root cause associated with each of the set of errors, and each of the set of possible solutions may be generated in order to determine accuracy of each of the set of errors, the root cause associated with each of the set of errors, and each of the set of possible solutions. Further, the generated report may be displayed to the end-user. Moreover, the report generation module 210 may be configured to send the generated report to the feedback processing module 212.

In one embodiment, the feedback processing module 212 may be configured to receive a feedback 216 from the end-user based on the anomaly report generated by the anomaly detection module 206. In another embodiment, the feedback processing module 212 may be configured to receive the feedback 216 from the end-user for the report generated based on the predictive analysis performed by the error prediction module 208. Further, the feedback processing module 212 may be configured to process the feedback 216 received from the end-user for the report generated based on the predictive analysis performed based on a pre-configured threshold value.

Moreover, in order to process the feedback 216, the feedback processing module 212 may provide an option to the end-user to accept or reject each of the set of possible solutions based on the generated confidence score and the pre-configured threshold value associated with each of the set of possible solutions. Based on the option selected by the end-user, the AI model 104 may be configured to perform suitable actions in order to complete the option selected by the end-user. Further, once the option selected by the end-user is completed, the feedback processing module 212 may be configured to send results of options selected by the end-user to the incremental learning engine 214

In one embodiment, the incremental learning engine 214 may be configured to receive the feedback 216 provided by the end-user from the feedback processing module 212. In this embodiment, the end-user may provide the feedback 216 for the one or more of the plurality of anomalies represented in the generated anomaly report. Further, based on the feedback 216 received, the incremental learning engine 214 may be configured to perform incremental learning for the AI model 104 based on the one or more of the plurality of anomalies.

In another embodiment, the incremental learning engine 214 may be configured to receive the results of options selected by the end-user for the report generated based on the predictive analysis performed from the feedback processing module 212. Upon receiving the results, the incremental learning engine 214 may be configured to perform incremental learning for the AI model 104. In an embodiment, the incremental learning engine 214 may perform incremental learning for the AI model 104 based a new error identified in the set of errors. Moreover, in order to perform the incremental learning for the AI model 104, the incremental learning engine 214 may utilize reinforcement learning technique.

Further, the database 218 connected with the AI model 104 may be updated based on the feedback 216 received from the end user and the results of options selected by the end-user. In an embodiment, the database 218 may be updated based on the new error identified and selection of option (i.e., the acceptance or rejection) by the end-user for one of the set of possible solutions recommended for the new error. In reference to FIG. 1, the database 218 may correspond to the database 114.

In particular, as will be appreciated by those of ordinary skill in the art, various modules 204-214 for performing the techniques and steps described herein may be implemented in the electronic device 102, either by hardware, software, or combinations of hardware and software. For example, suitable code may be accessed and executed by the one or more processors on the electronic device 102 to perform some or all of the techniques described herein. Similarly, application specific integrated circuits (ASICs) configured to perform some, or all of the processes described herein may be included in the one or more processors on the host computing system. Even though FIGS. 1-2 describe the electronic device 102, the functionality of the components of the electronic device 102 may be implemented in any computing devices.

Figure 3:
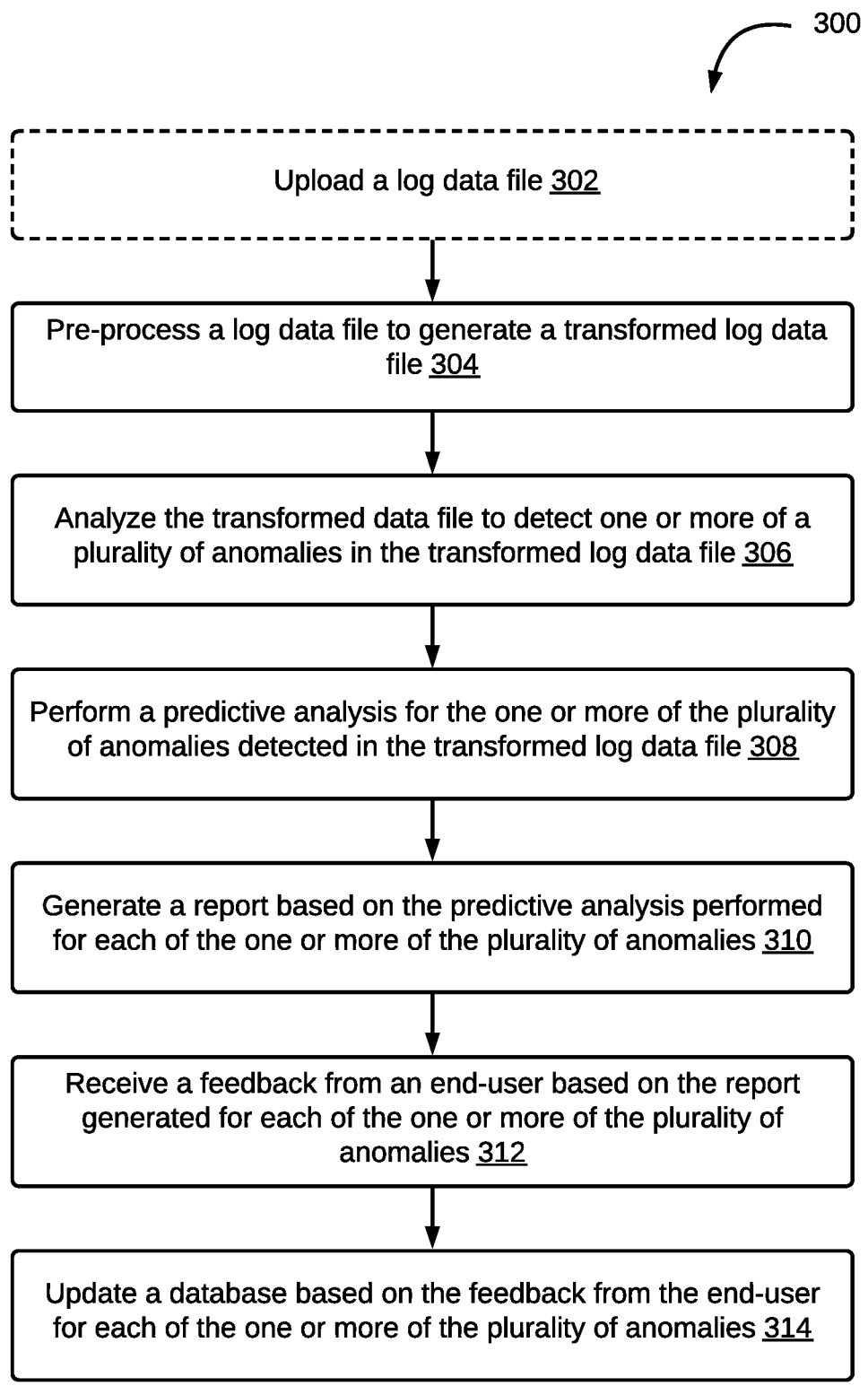
FIG. 3 illustrates a flowchart of a method for automating analysis of log data files, in accordance with an embodiment.

Referring now to FIG. 3, a flowchart of a method 300 for automating analysis of log data files is illustrated, in accordance with an embodiment. At step 302, a log data file may be uploaded. The log data file may be uploaded by an end-user. In an embodiment, the end user may correspond to an engineer or a developer responsible for analyzing log data file. Moreover, in order to upload the log data file, the end-user may login in an electronic device using login credentials associated with the end-user. The login credentials may include, but is not limited to a username and a password. In reference to FIG. 1, the electronic device may correspond to the electronic device 102. In an embodiment, the electronic device 102 may also be referred as the AI based log analyzer.

Once the user uploads the log data file, at step 304, the uploaded log data file may be pre-processed. The log data file may be pre-processed in order to generate a transformed log data file. In an embodiment, the log data file may include a set of data files in one a plurality of data formats. Examples of the plurality of data formats may include, but is not limited to, National Center for Supercomputing Application (NCSA) common log format, World Wide Web Consortium (W3C) extended, Sun™ ONE Web Server (iPlanet), WebSphere Application Server Logs., File Transfer Protocol (FTP) logs, and Custom Log File Format. A method of pre-processing the log data file has been further explained in greater detail in conjunction to FIG. 5 and FIG. 6.

Further, at step 306, the transformed log data file may be analyzed. The transformed log data file may be analyzed in order to detect one or more of a plurality of anomalies in the log data file. The one or more of the plurality of anomalies is detected by identifying one of a new and abnormal behavior associated with the transformed log data file. By way of an example, while analyzing authentication logs for a system, the new or abnormal behavior may correspond to detection usage of Information Technology (IT) resources by a particular employee for which the particular employee may not have access of. A process of analyzing the log data file in order to detect the one or more of the plurality of anomalies has been further explained in greater detail in conjunction to FIG. 8.

Once the one or more of the plurality of anomalies are detected, at step 308, a predictive analysis may be performed for the one or more of the plurality of anomalies detected in the transformed log data file. In an embodiment, the predictive analysis may be performed based on a set of factors and a confidence score associated with each of the set of factors. The set of factors may include, but is not limited to number of errors generated, category of each of the number of errors generated, root cause associated with each of the number of errors generated, and a set of possible solutions associated with each of the number of errors generated.

Moreover, the confidence score associated with each of the set of factors may be in a pre-defined range. By way of example, the pre-defined range for the confidence score associated with each of the set of factors may be defined to be "0 to 1". Further, the confidence score '0' detected for one or more of the set of factors may depict lowest accuracy for the one or more of the set of factors. Further, the confidence score '1' detected for one or more of the set of factors may depict highest accuracy for the one or more of the set of factors. A process of performing the predictive analysis for the one or more of the plurality of anomalies has been explained in greater detail in conjunction to FIG. 7 to FIG. 9.

Further, at step 310, a report may be generated based on the predictive analysis performed for each of the one or more of the plurality of anomalies. In an embodiment, the report may correspond to a user friendly report representing predicted information. The predicted information may correspond to the set of errors identified in the transformed log data file, the root cause associated with each of the set of errors, each of the set of possible solutions recommended, and the associated confidence score.

Once the report is generated, at step 312, a feedback may be received from the end-user based on the report generated for each of the one or more of the plurality of anomalies. In an embodiment, the end-user may provide the feedback based on a pre-configured threshold value. Moreover, in order to provide the feedback, the end-user may perform one of an acceptance or rejection of each of the set of possible solutions based on the generated confidence score. Further, at step 314, a database may be updated based on the feedback received from the end-user for each of the one or more of the plurality of anomalies. Moreover, in order to update the database, an incremental learning may be performed in order to train the AI model for the one or more of the plurality of anomalies based on the received feedback. In reference to FIG. 1, the AI model may correspond to the AI model 104 and the database may correspond to the database 114. A process of receiving the feedback and updating of the database has been further explained in greater detail in conjunction to FIG. 10-FIG. 12.

Figure 4:
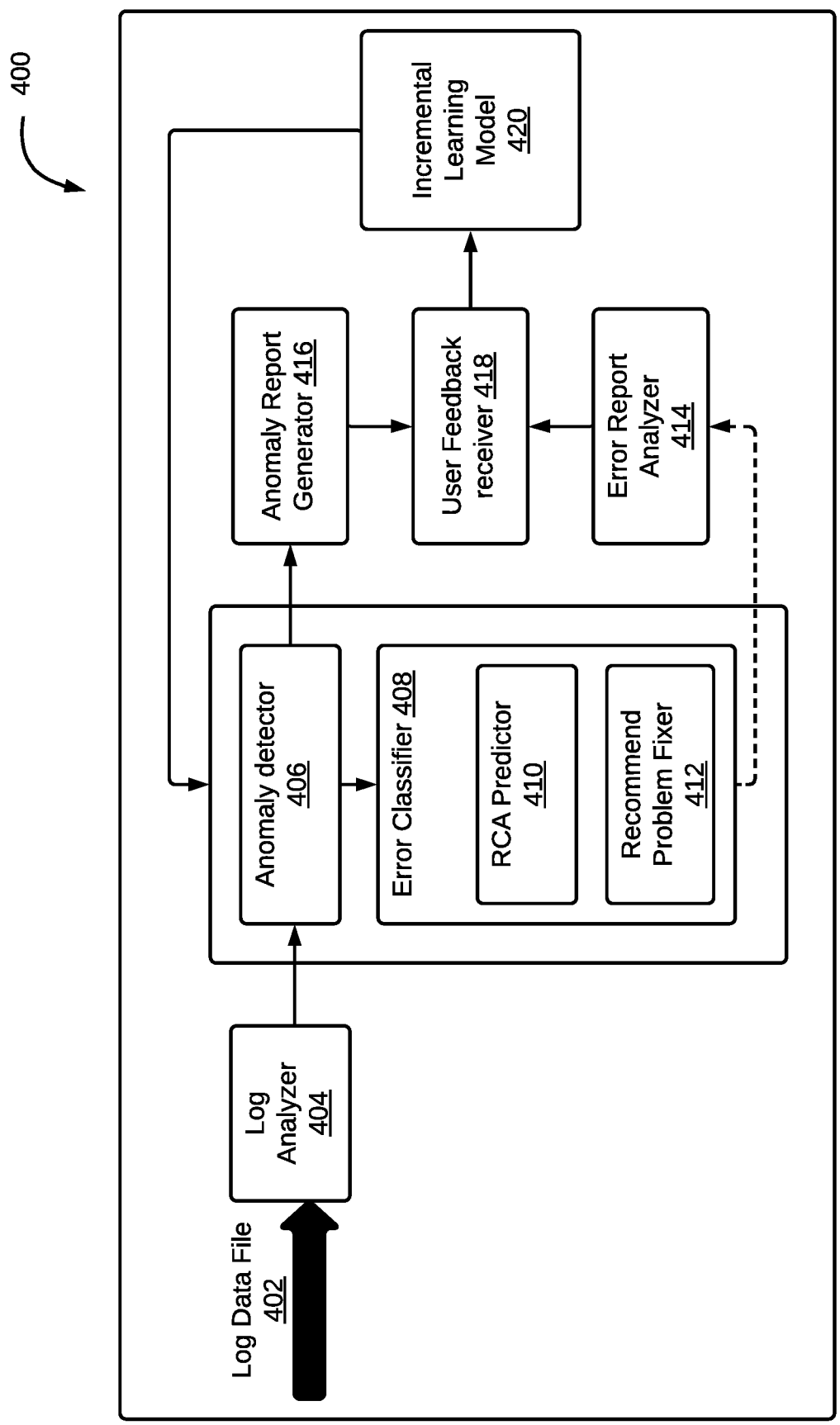
FIG. 4 illustrates a flow diagram of a process for automating analysis of log data files, in accordance with an embodiment.

Referring now to FIG. 4, a flow diagram of a process 400 for automating analysis of log data files is illustrated, in accordance with an embodiment. In present FIG. 4, at step 402, the log data file is uploaded by the end-user in the AI based log analyzer depicted as 'a log analyzer 404' (also referred as iLog Analyzer). In reference to FIG. 1, the log analyzer 404 may correspond to the electronic device 102. In an embodiment, the end-user may correspond to the engineer or the developer responsible for performing analysis of the log data file. The log data file may include the set of data files in one of the plurality of data formats. In order to upload the log data file in the log analyzer 404, the end-user may login in the log analyzer 404 using his login credentials. The login credentials may include, but is not limited to, the username and the password associated with the end-user.

Upon receiving the log data file, the log analyzer 404 may be configured to pre-process the log data file. The log analyzer 404 may pre-process the log data file. In an embodiment, the pre-processing of the log data may be done to generate the transformed log data file. Moreover, in order to pre-process the log data file to generate the transformed log data file, the log analyzer 404 may use K-means clustering algorithm and drain algorithm.

Further, the log analyzer 404 may be configured to analyze the transformed log data file. In order to analyze the transformed log data file, the log analyzer 404 may send the transformed log data file to an anomaly detector 406 for further analysis. The anomaly detector 406 may be configured to detect the one or more of the plurality of anomalies in the transformed log data file. The one or more of the plurality of anomalies may be detected by the anomaly detector 406 by identifying one of a new and abnormal behavior associated with the transformed log data file. In other words, the one or more of the plurality of anomalies may correspond to an abnormality that does not fit with rest of patterns present in the transformed log data file. In reference to FIG. 2, the anomaly detector 406 may correspond to the anomaly detection module 206.

In one embodiment, the anomaly detector 406 may be configured to send the one or more of the plurality of anomalies detected in the transformed log data file to an error classifier 408. Upon receiving the one or more of the plurality of anomalies, the error classifier 408 may be configured to perform the predictive analysis for the one or more of the plurality of anomalies detected in the transformed log data file. In an embodiment, the predictive analysis may be performed based on the set of factors and the confidence score associated with each of the set of factors. The set of factors may include, but is not limited to, number of errors generated, category of each of the number of errors generated, root cause associated with each of the number of errors generated, and a set of possible solutions associated with each of the number of errors generated.

Initially, the error classifier 408 may identify the set of errors in the transformed log data file. Each of the set of errors may be identified based on the one or more of the plurality of anomalies detected in the transformed log data file. Once the set of errors are identified, the error classifier 408 may be configured to classify each of the set of errors in one of the plurality of error categories. Examples of the plurality of error categories may include, but is not limited to, threshold error, fatal error, session failure error, source file not found, and unable to generate session.

Further, the error classifier 408 may include a Random Coefficient Autoregressive (RCA) predictor 410 and a recommend problem fixer 412. Once each of the set of errors are classified in one of the plurality of error categories, the RCA predictor 410 may be configured to predict the root cause associated with each of the set of errors identified corresponding to the transformed log data file. Upon detecting the root cause, the recommend problem fixer 412 may be configured to recommend the set of possible solutions to the end-user. Each of the set of possible solutions may be recommended based on the identified root cause for each of the set of errors identified. Moreover, the recommend problem fixer 412 may be configured to generate the confidence score for each of the set of errors, the root cause associated with each of the set of errors, and each of the set of possible solutions recommended.

Further, based on the set of possible solutions recommended, the error classifier 408 may be configured to generate the report in order to perform the predictive analysis. In reference to FIG. 2, the error classifier 408 may correspond to the error prediction module 208. Moreover, the generated report may be sent to an error report analyzer 414. The error report analyzer 414 may be configured to analyze the generated report based on the confidence score generated for each of the set of errors, the root cause associated with each of the set of errors, and each of the set of possible solutions.

Further, the confidence score generated for each of the set of factors may be in the pre-defined range. By way of example, the pre-defined range for the confidence score associated with each of the set of factors may be defined to be "0 to 1". Further, the confidence score '0' detected for one or more of the set of factors may depict lowest accuracy for the one or more of the set of factors. Moreover, the confidence score '1' detected for one or more of the set of factors may depict highest accuracy for the one or more of the set of factors. In addition, the generated confidence score may help alerting the end-user (i.e., the engineer and the developer) about accuracy associated with each of the set of errors, accuracy of the root cause associated with each of the set of errors, and accuracy of each of the set of possible solutions recommended.

By way of example, one of the set of errors having the confidence score of '1' may be considered to be an actual error, i.e., an error having higher accuracy. While one of the set of errors having the confidence score '0' may be considered to be a false error, i.e., an error having lowest accuracy. By way of another example, one of the set of possible solutions having the confidence score as '1' may be considered to be an accurate solution, i.e., the solution having highest accuracy. While one of the set of possible solutions having the confidence score as '0' may be considered to be an inaccurate solution i.e., the solution having lowest accuracy.

Further, the error report analyzer 414 may be configured to send the generated report to a user feedback receiver 418. The user feedback receiver 418 may be configured to receive the feedback based on the generated report from the end-user. In an embodiment, the end-user may provide the feedback based on the generated confidence score. In order to provide the feedback, the end-user may perform one of the acceptance or rejection of each of the set of possible solutions recommended. Moreover, the end-user may perform one of the acceptance or rejection of each of the set of possible solutions based on the pre-configured threshold value.

By way of an example, the pre-configured threshold value may be defined as '0.5'. Now suppose the confidence score associated with one of the set of possible solutions may be predicted to be '0.8'. Based on the pre-configured threshold value, i.e., '0.5' and the confidence score predicted, i.e., '0.8', the end-user may perform acceptance of the one of the set of possible solutions. In an embodiment, the end-user may accept the one of the set of possible solutions having the confidence score of '0.8', as accuracy of the one of the set of possible solutions may be high. This is because the confidence score predicted for the one of the set of possible solutions is '0.8', which is near to '1' (i.e., highest pre-defined accuracy range) and is greater than the pre-configured threshold value '0.5'.

By way of another example, the pre-configured threshold value may be defined as '0.5'. Now suppose the confidence score associated with one of the set of possible solutions may be predicted to be '0.2'. Based on the pre-configured threshold value, i.e., '0.5' and the confidence score predicted, i.e., '0.2', the end-user may perform rejection of the one of the set of possible solutions. In an embodiment, the end-user may reject the one of the set of possible solutions having the confidence score of '0.2', as accuracy of the one of the set of possible solutions may be low. This is because the confidence score predicted for the one of the set of possible solutions is '0.2', which is near to '0' (i.e., lowest pre-defined accuracy range) and is less than the pre-configured threshold value '0.5'.

In second embodiment, the anomaly detector 406 may be configured to send the one or more of the plurality of anomalies detected in the transformed log data file to an anomaly report generator 416. The anomaly report generator 416 may be configured to generate the anomaly report representing the one or more of the plurality of anomalies detected in the transformed log data file. Further, the generated anomaly report may be sent to the user feedback receiver 418. The user feedback receiver 418 may be configured to receive the feedback from the end-user based on the one or more of the plurality of anomalies detected in the transformed log data file. In reference to FIG. 2, the user feedback receiver 418 may correspond to the feedback processing module 212. By way of an example, one of the one or more of the plurality of anomalies may correspond to a new log entry in the transformed log data file. Further, the end-user may perform acceptance of the new log entry in order to train an incremental learning model 420 for the new log entry. In reference to FIG. 2, the incremental learning model 420 may correspond to the incremental learning engine 214 of the AI model 104.

Once the user feedback for the generated anomaly report and the report generated for the predictive analysis performed is received by the user feedback receiver 418, the incremental learning model 420 may be configured to perform self-learning based on the feedback received from the end-user. The self-learning may be performed by the incremental learning model 420 using the reinforcement learning technique. Moreover, the self-learning capability of the incremental learning model 420 may support in enriching knowledge of Small Medium Enterprises (SME's). This is because, the incremental learning model 420 may get enhanced with new features based on detection of unlearnt errors (also referred as new errors) or new anomalies. Moreover, the AI based log analyzer (i.e., the log analyzer 404) may allow the SMEs to map the root cause for the one or more of the plurality of anomalies and the root cause associated with the each of the set of errors for future association.

The log analyzer 404 disclosed in the present embodiment may be unique and outstands from existing log analyzers. This is because, the log analyzer 404 disclosed in the present embodiment receives heterogeneous log data files and pre-process the received heterogeneous log data files in order to generate the transformed log data file. The transformed log data file generated may be used for further analysis. Moreover, the log analyzer 404 may be connected to the anomaly detector 406 to identify the new and abnormal behavior in the transformed log data file. Upon detecting the new and abnormal behavior, the error classifier 408 may be configured to classify each of the set of errors in one of the plurality of categories. In addition, the log analyzer 404 may apply domain knowledge to identify the root cause associated with the set of errors and proposes the set of possible solution to the end-user (i.e., the engineer and the developers). Further, the error classifier 408 may identify the root cause associated with the set of errors. Additionally, the error classifier 408 may recommend the set of possible solutions.

Further, the incremental learning model 420 may help the log analyzer 404 to perform self-learning in order to learn depth of each of the set of errors identified in the transformed log data file. Moreover, the log analyzer 404 may memorize, learn and understand error scenarios (i.e., the set of errors and the root cause associated with each of the of set of errors) with very minimal error patterns. Therefore, the log analyzer 404 removes dependency on volume of the transformed log data file, the set of errors identified, the root cause associated with the set of errors, and the set of possible solutions recommended with higher accuracy.

Figure 5:
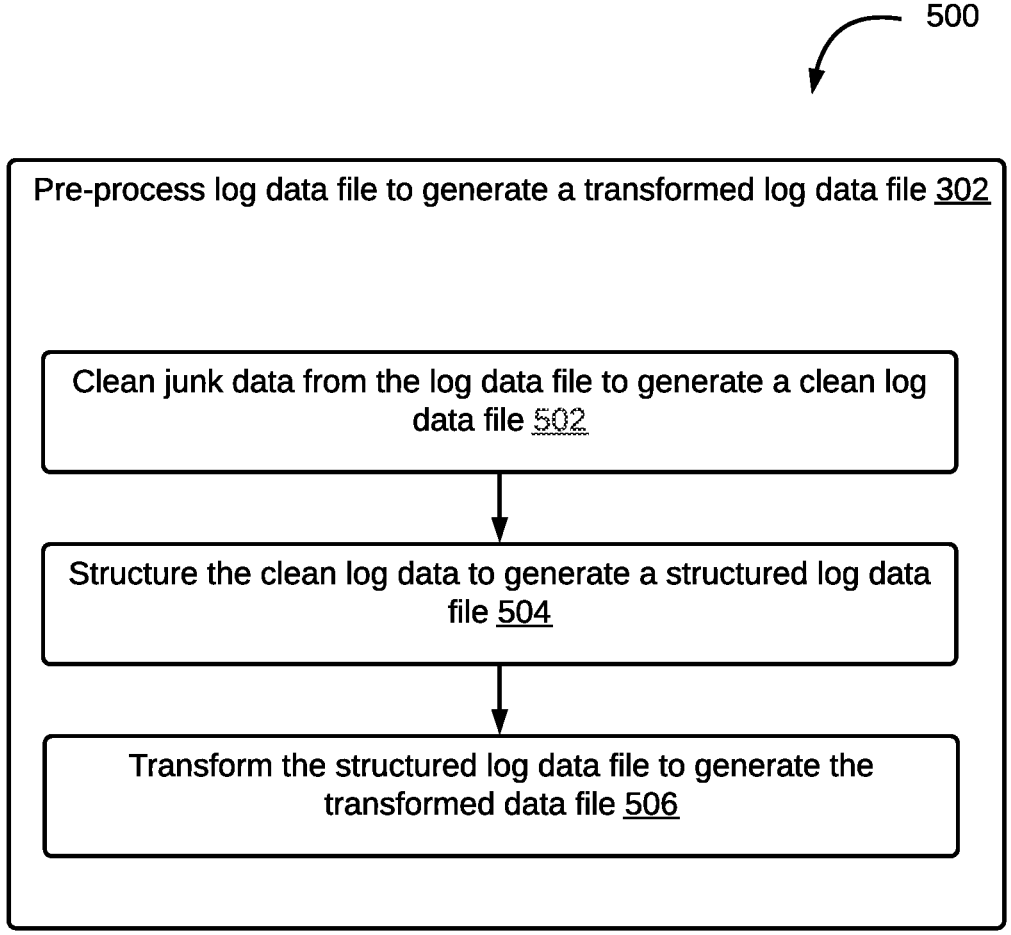
FIG. 5 illustrates a flowchart of a method for performing pre-processing of a log data file, in accordance with an embodiment.

Referring now to FIG. 5, a flowchart of a method 500 for performing pre-processing of a log data file is illustrated, in accordance with an embodiment. In reference to FIG. 3, as depicted in step 302, in order to pre-process the log data file to generate the transformed log data file, at step 502, junk data may be cleaned from the log data file. Moreover, the junk data may be cleaned in order to generate a clean log data file. Examples of junk data may include, but is not limited to, repeated data, void data, and obsolete data. It should be noted that, the log data file may include the set of data files in one the plurality of data formats.

Examples of the plurality of data formats may include, but is not limited to, National Center for Supercomputing Application (NCSA) common log format, World Wide Web Consortium (W3C) extended, Sun™ ONE Web Server (iPlanet), WebSphere Application Server Logs, File Transfer Protocol (FTP) logs, and Custom Log File Format. In an embodiment, in order to generate the clean log data file, clustering (also referred as grouping) of each of a set of similar data files from the set of data files may be done. Moreover, the set of similar data files clustered together may be in one of the plurality of data formats. By way of an example, in order group the one or more of the set of similar data files from the set of data files, K-means clustering algorithm may be used.

Once the clean log data file is generated, at step 504, structuring of the clean log data file may be done. The structuring of the clean log data file may be done in order to generate a structured log data file. In an embodiment, the structured log data file may be generated using the drain algorithm. As will be appreciated, the structured log data file may correspond to a log data file in a machine readable form.

Based on the structured log data file generated, at step 506, the structured log data file may be transformed to generate the transformed log data file. The transformed log data file may correspond to a clean and structured log data file. In an embodiment, the drain algorithm may be customized to generate log index mapping Java Script Object Notation (JSON) file for the structured log data file. In addition, the drain algorithm may be customized to transform the structured log data file in order to generate the transformed log data file.

Figure 6:
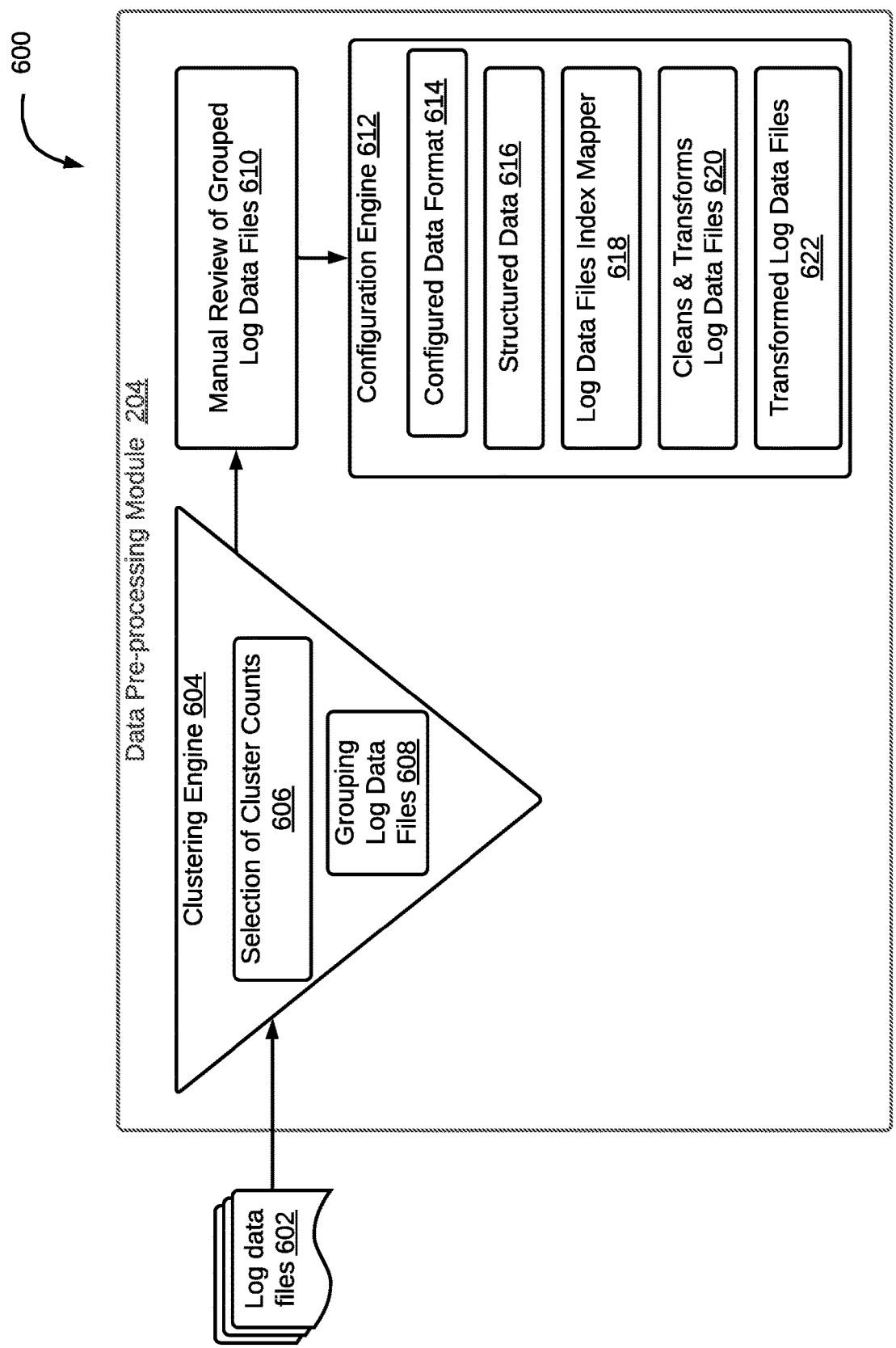
FIG. 6 illustrates a flow diagram of a process performed by a data pre-processing module to pre-process a log data file, in accordance with an embodiment.

Referring now to FIG. 6, a flow diagram of a process 600 performed by a data pre-processing module to pre-process a log data file is illustrated, in accordance with an embodiment. In reference to FIG. 2, in order to pre-process the log data file, the data pre-processing module 204, may receive log data files 602 as an input. It should be noted that, at once, the end-user may upload multiple log data files for analysis. Upon receiving the log data files 602, a clustering engine 604 may perform cleaning of the log data files 602 in order to generate the cleaned log data files. Moreover, to perform cleaning of the log data files 602, the clustering engine 604 may cluster each of the set of similar data files present in the log data files 602.

In order to cluster each of the set of similar data files, at step 606, the clustering engine 604 may perform a selection of cluster counts in the log data files 602. Once the selection of cluster counts is done, at step 608, grouping of each of the set of similar data files present in the log data files 602 may be performed. In an embodiment, grouping of each of the set of similar data files may be done using centroid. Moreover, in order to perform clustering of each of the set of similar data files, K-means clustering algorithm may be used.

Once grouping of each of the set of similar data files present in the log data files 602 is done, at step 610, manual reviewing may be performed for each of the set of similar data files grouped. In an embodiment, manual reviewing of each of the set of similar data files may be done in order identify one of the plurality of data formats associated with each of the set of similar data files. Upon identifying one of the plurality of data formats associated with each of the set of similar data files, at step 612, each of the set of similar data files along with the associated data format may be updated in a configuration engine.

Further, at step 614, the one of the plurality of data formats associated with each of the set of similar data files may be configured. Once configured, at step 616, the structuring of the clean log data files may be done that are generated corresponding to the log data files 602. The structuring of the clean log data files may be done in order to generate the structured log data files. In an embodiment, the drain algorithm may be used in order to generate the structured log data files. Upon generating the structured log data files, at step 618, index mapper for each of the structured log data files may be generated. In an embodiment, index mapper generated for each of the structured log data files may also be referred as log index mapping JSON file. Once the index mapper is generated, at step 620, the structured log data files may be cleaned and transformed. Based on the cleaning and transforming performed for the structured log data files, at step 622, the transformed log data files may be generated. In reference to FIG. 2, the transformed log data files generated may be fed as an input to the anomaly detection module 206.

Figure 7:
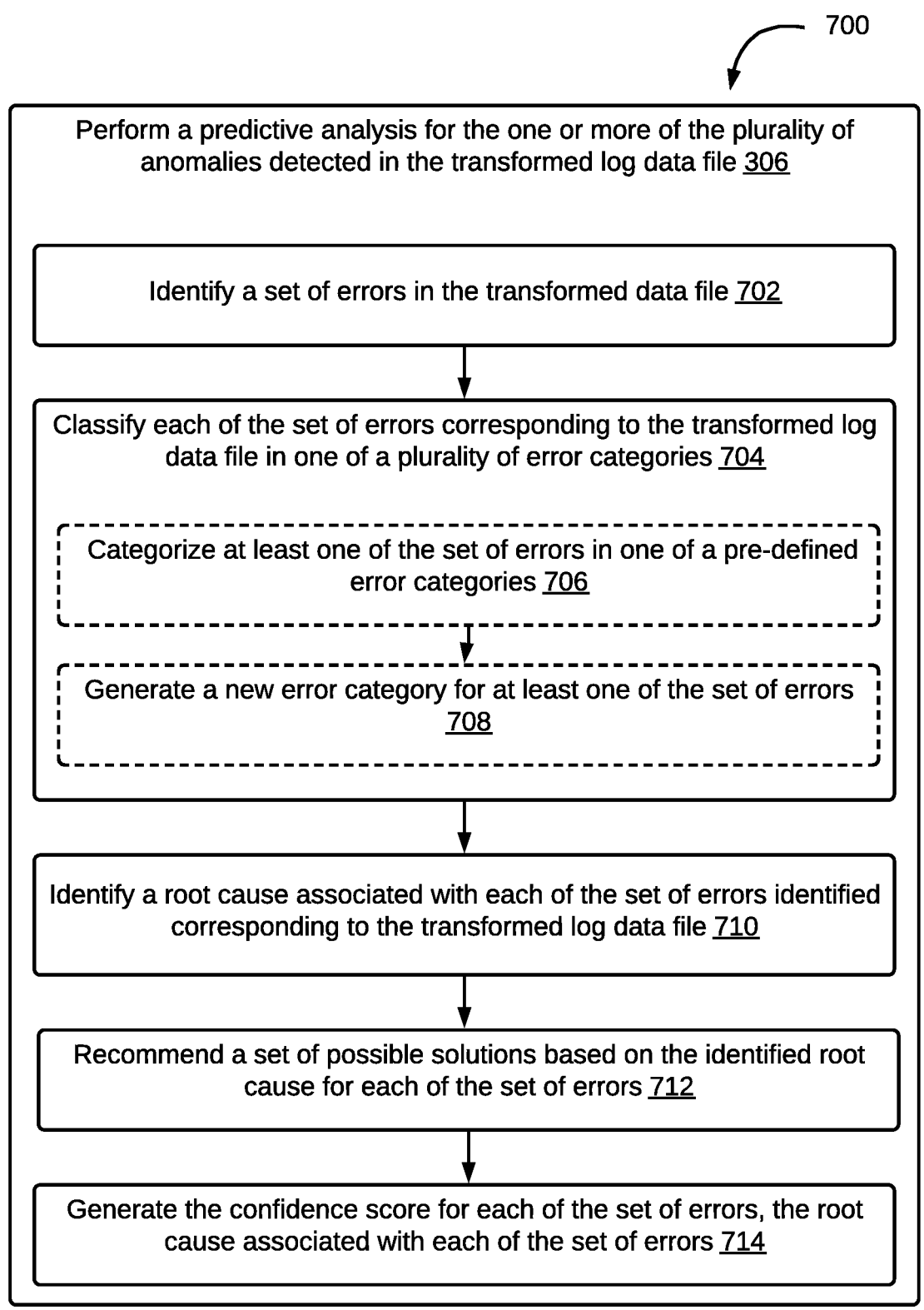
FIG. 7 illustrates a flowchart of a method for performing a predictive analysis for one or more of the plurality of anomalies, in accordance with an embodiment.

Referring now to FIG. 7, a flowchart of a method 700 for performing a predictive analysis for one or more of the plurality of anomalies is illustrated, in accordance with an embodiment. In reference to FIG. 3, as depicted in step 306, in order to perform the predictive analysis for the one or more of the plurality of anomalies detected in the transformed data file, at step 702, a set of errors may be identified in the transformed data file. The set of errors may be identified based on the one or more of the plurality of anomalies detected in the transformed log data file. Once the set of errors is identified, at step 704, each of the set of errors corresponding to the transformed log data file may be classified. The each of the set of errors identified in the transformed log data file may be classified in one of the plurality of error categories. Examples of the plurality of error categories may include, but is not limited to, threshold error, fatal error, session failure error, source file not found, and unable to generate session.

Further, in order to classify each of the set of errors in one of the plurality of error categories, at step 706, at least one of the set of errors may be categorized in one of a pre-defined error categories. Moreover, at step 708, a new error category may be generated for at least one of the set of errors. In an embodiment, the new error category may be generated upon identifying a new error from the set of errors identified in the transformed log data file. In other words, the new error category may be generated upon identifying the new error in the set of errors that does not belongs to the pre-defined error categories.

Once each of the set of error are classified in one of the plurality of error categories, at step 710, a root cause associated with each of the set of errors may be identified corresponding to the transformed log data file. Upon identifying the root cause, at step 712, a set of possible solutions may be recommended. Each of the set of possible solutions may be recommended based on the identified root cause for each of the set of errors. Further, at step 714, the confidence score may be generated for each of the set of errors, the root cause associated with each of the set of errors, and each of the set of possible solutions. In an embodiment, the confidence score may be generated in order to determine accuracy for each predictions made, i.e., the accuracy of each of the set of errors, the accuracy of the root cause associated with each of the set of errors, and accuracy of each of the set of recommended solutions.

Moreover, the confidence score associated with each of the set of factors may be in the pre-defined range. The set of factors may include, but is not limited to number of errors generated, category of each of the number of errors generated, root cause associated with each of the number of errors generated, and a set of possible solutions associated with each of the number of errors generated. By way of example, the pre-defined range for the confidence score associated with each of the set of factors may be defined tin a range of "0 to 1". Further, the confidence score '0' detected for one or more of the set of factors may depict lowest accuracy for the one or more of the set of factors. Further, the confidence score '1' detected for one or more of the set of factors may depict highest accuracy for the one or more of the set of factors.

Once the confidence score is generated, the report may be generated based on the predictive analysis performed for each of the one or more of the plurality of anomalies. In reference to FIG. 1, the generated report may be rendered to the end-user via the user interface 112. Based on the generated report, the end-user may provide the feedback for each of the one or more of the plurality of anomalies detected.

Figure 8:
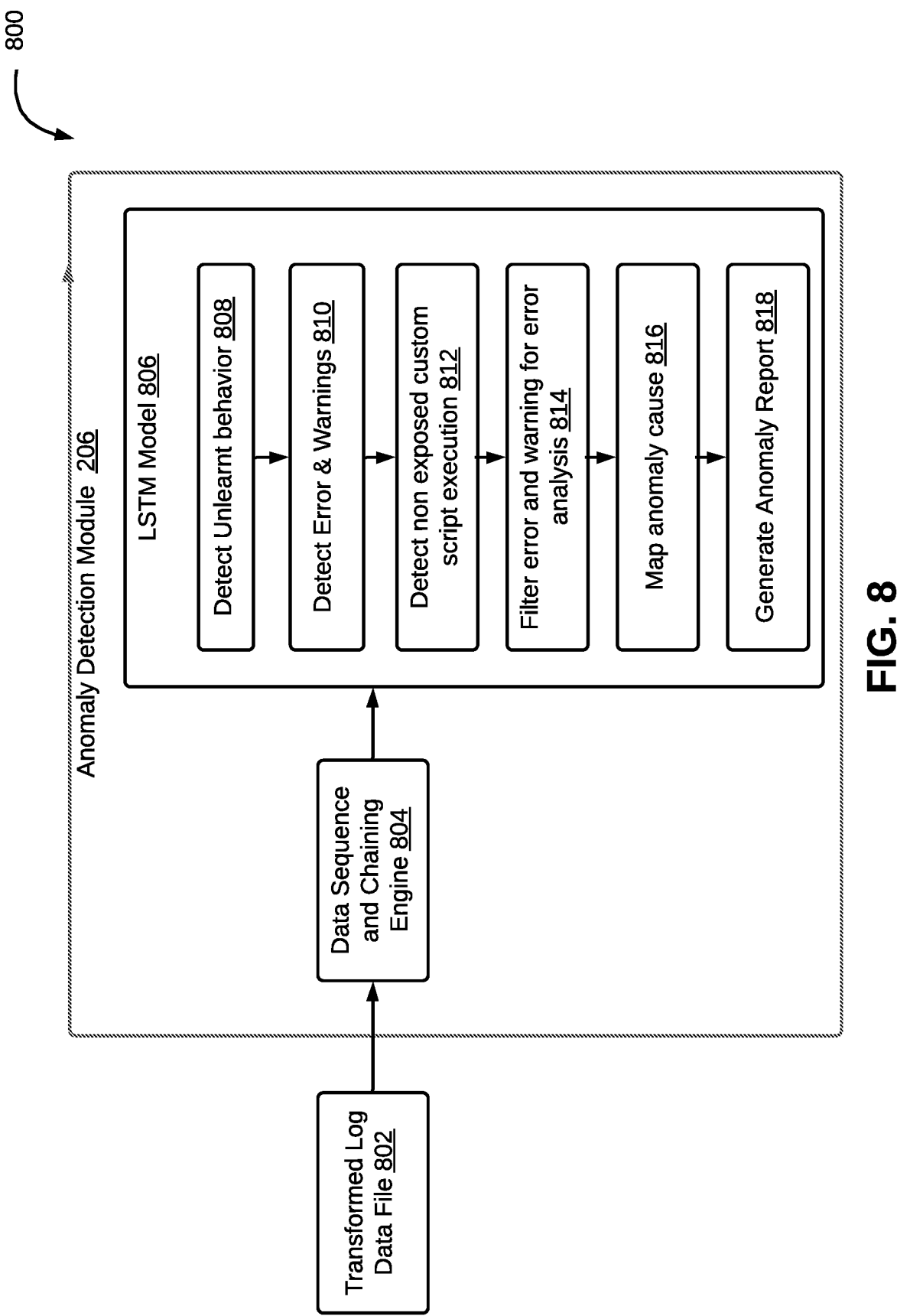
FIG. 8 illustrates a flow diagram of a process performed by an anomaly detection module to perform predictive analysis for one or more of the plurality of anomalies, in accordance with an embodiment.

Referring now to FIG. 8, a flow diagram of a process 800 performed by an anomaly detection module to perform predictive analysis for one or more of the plurality of anomalies is illustrated, in accordance with an embodiment. In reference to FIG. 2, in order to pre-process the log data file, the anomaly detection module 206, may receive a transformed log data file 802 as an input. Upon receiving the transformed log data file 802, at step 804, a data sequence and chaining engine may utilize auto-labelling technique to perform automatic labeling for each of the set of similar data files grouped (i.e., clustered) together. In an embodiment, each of the set of similar data files grouped may correspond to set of one or more similar data file present in the set of data files of the transformed log data file 802.

Once the labels for each of the set of similar data files are generated, a Long Short Term Memory (LSTM) model 806 may be configured to perform analysis in order to detect the one or more of the plurality of anomalies in the transformed log data file 802. In order to detect the one or more of the plurality of anomalies, at step 808, unlearnt behaviors may be detected in the transformed log data file 802. In an embodiment, the unlearnt behaviors may correspond the new and abnormal behavior associated with the transformed log data file 802. In other words, the unlearnt behaviors may correspond to log message sequence that is not present in learnt sequence by an AI model. In reference to FIG. 1, the AI model may correspond to the AI model 104.

Upon detecting the unlearnt behaviors, at step 810, the set of errors associated with the transformed log data file 802 may be identified. Based on the set of errors identified, at step 812, non-exposed custom scripts present in the transformed log data file 802 may be detected for execution by the LSTM model 806. Further, at step 814, each of the set of errors identified in the transformed log data file 802 may be filtered for error analysis. In other words, each of the set of errors identified may be filtered in order to be further processed by the error prediction module 208. Once each of the set of errors are filtered, at step 816, the one or more of the plurality of anomalies detected may be mapped with the root cause associated with each of the one or more of the plurality of anomalies by the LSTM model 806.

Based on mapping of each of the one or more of the plurality of anomalies with the associated root cause, at step 818, the anomaly report may be generated. The generated anomaly report may depict the one or more of the plurality of anomalies, the root cause associated with each of the one or more of the plurality of anomalies, and actions to be performed by the end-user. Upon receiving the anomaly report, the end-user may provide feedback for each of the one or more of the plurality of anomalies represented in the generated anomaly report. Further, based on the feedback provided by the end-user, the incremental learning may be performed for the AI based log analyzer. In reference to FIG. 1, the AI based log analyzer may correspond to the electronic device 102.

Figure 9:
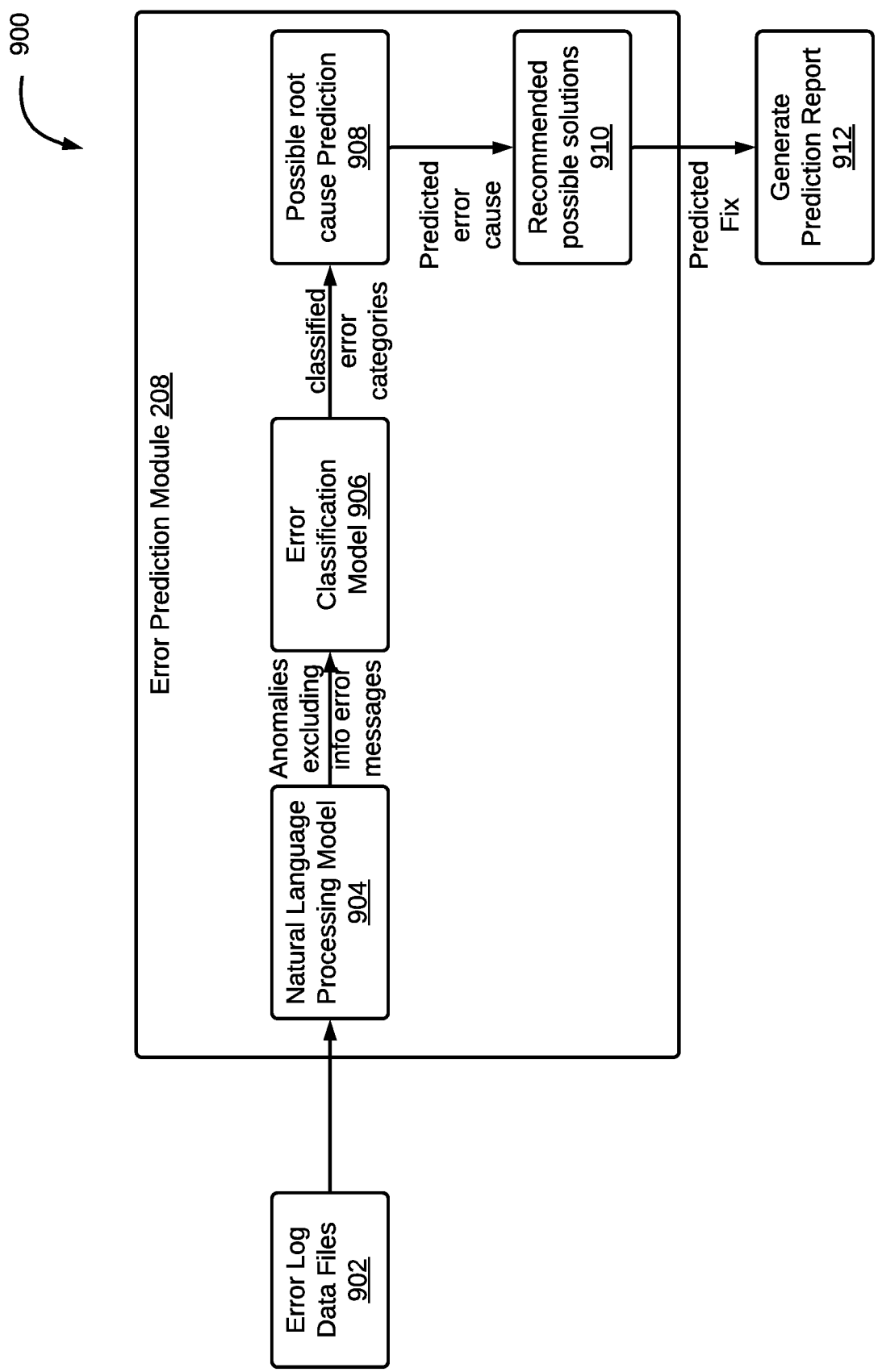
FIG. 9 illustrates a flow diagram of a process performed by an error prediction module to generate a report, in accordance with an embodiment.

Referring now to FIG. 9, a flow diagram of a process 900 performed by an error prediction module to generate a report is illustrated, in accordance with an embodiment. In reference to FIG. 2, in order to analyze each of the set of errors identified in the transformed log data file, the error prediction module 208, may receive each of the set of errors identified in the transformed log data file as an input. In present FIG. 9, each of the set of errors may correspond to an error log data file 902. Upon receiving the error log data files 902, at step 904, a natural learning processing model may pre-process each of the set of errors in order to perform the predictive analysis.

Further, at step 906, the one or more of the plurality of anomalies excluding info error messages may be fed as input to an error classification model. In an embodiment, the one or more of the plurality of anomalies excluding info error messages may correspond to the set of errors. Further, each of the set of errors may be fed as the input to the error classification model in order to classify each of the set of errors in one of the plurality of error categories. Once each of the set of errors are classified, at step 908, the root cause associated with each of the set of errors classified may be identified.

In order to identify the root cause, a Siamese model architecture including Galileo In-Orbit Validation Element (GIOVE) unsupervised learning algorithm may be used. The GIOVE unsupervised learning algorithm may provide vector representation for each of the set of errors identified. In an embodiment, in order to identify the root cause, a metric may be created using two local variables. The two local variables may include 'total' and 'count' that may be used to compute frequency for which predicted value for the root cause may match true value for the root cause. Further, the computed frequency may be ultimately returned as binary accuracy. For this, idempotent operations may be used that may divide two local variables, i.e., total divided by count.

Upon identifying the root cause, at step 910, the set of possible solutions may be recommended for each of the set of errors classified. Based on the set of possible solutions recommended, at step 912, the report may be generated based on the predictive analysis performed for each of the set of errors. Upon receiving the report, the end-user may provide the feedback corresponding to each of the set of errors represented in the generated report. In order to provide the feedback, the end-user may perform one of the acceptance or rejection of one of the set of possible solutions recommended for each of the set of errors.

In an embodiment, the end-user may perform one of the acceptance or rejection of each of the set of possible solutions based on the confidence score generated and the pre-configured threshold value. It should be noted that, the confidence score may be generated for each of the set of errors, the root cause associated with each of the set of errors, and each of the set of possible solutions. Further, based on the feedback provided by the end-user, the incremental learning may be performed for the AI model. In reference to FIG. 1, the AI model may correspond to the AI model 104.

Figure 10:
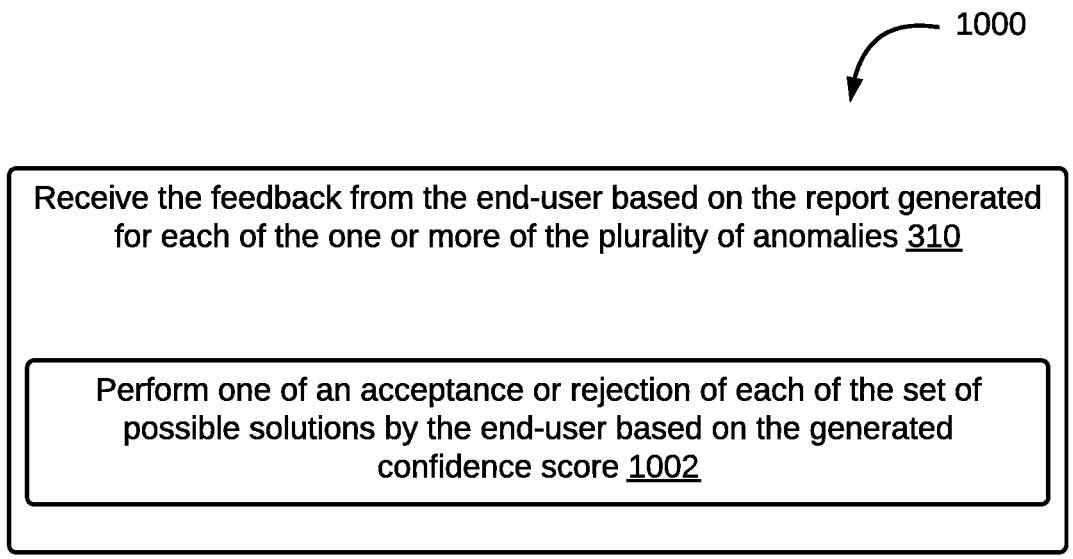
FIG. 10 illustrates a flowchart of a method for receiving feedback based on the generated report, in accordance with an embodiment.

Referring now to FIG. 10, a flowchart of a method 1000 for receiving feedback based on the generated report is illustrated, in accordance with an embodiment. In reference to FIG. 3, as depicted in step 306, in order to receive the feedback from the end-user, at step 1002, the end-user may perform one of an acceptance or rejection of each of the set of possible solutions. In an embodiment, the end-user may correspond to the engineer or the developer responsible for performing analysis of the log data file. Moreover, the end user may perform one of the acceptance or rejection of each of the set of possible solutions based on the confidence score associated with each of the set of possible solutions. In addition to the associated confidence score, the acceptance or rejection of the one of the set of possible solutions may depend upon the pre-configured threshold value associated with each of the set of possible solutions.

In an embodiment, the pre-configured threshold value may be defined in order to enable the end-user to determine whether to accept or reject the one of the set of possible solutions based on the associated confidence score. By way of an example, suppose the pre-configured threshold value for the set of possible solutions may be defined to be '0.4'. In one embodiment, suppose the confidence score generated for the one of the set of possible solutions may be predicted to be '0.1'. In reference to FIG. 1, the confidence score associated with the one of the set of possible solutions may be predicted by the AI model 104. As explained in FIG.7, since value '0' for the confidence score depicts lower accuracy and the pre-configured threshold value is defined to be '0.4', therefore the end-user may reject the one of the set of possible solutions recommend having the confidence score of '0.1'

Figure 11:
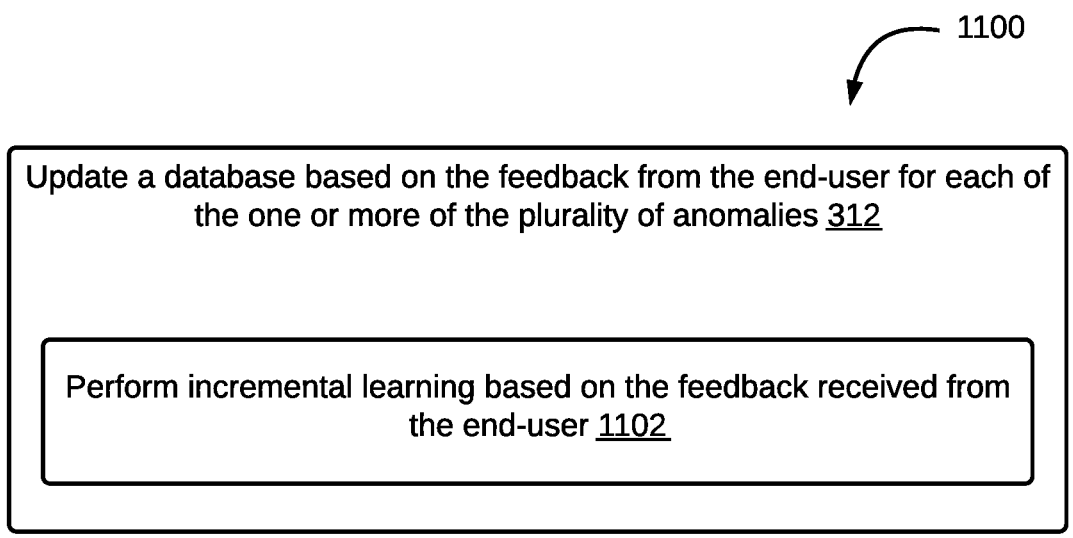
FIG. 11 illustrates a flowchart of a method of updating a database, in accordance with an embodiment.

Referring now to FIG. 11, a flowchart of a method 1100 of updating a database is illustrated, in accordance with an embodiment. In reference to FIG. 3, as depicted in step 306, in order to update the database based on the feedback received from the end-user, at step 1102, an incremental learning may be performed for an AI model. The feedback may be received for each of the one or more of the plurality of anomalies. In reference to FIG. 1, the AI model may correspond to the AI model 104. Moreover, the incremental learning for the AI model may be performed using the reinforcement learning technique. This incremental learning performed may enable the AI model to self-learn for future analysis upon identifying the new error or the new anomaly. In other words, the AI model may train itself using the reinforcement learning technique for the new error or the new anomaly. This self-learning technique may enable the AI model to automatically identify the new error while performing analysis of a new log data file in future.

Figure 12:
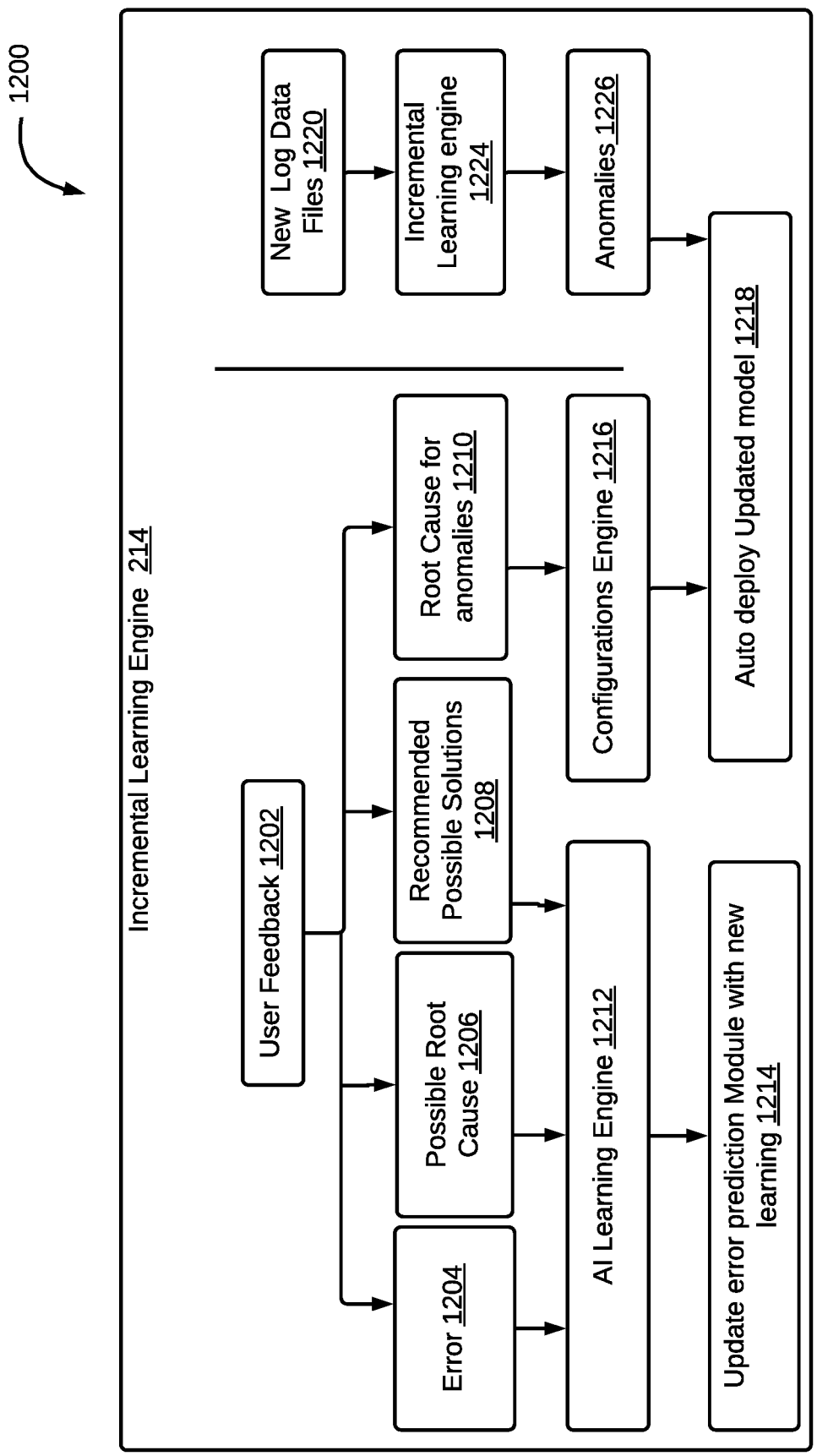
FIG. 12 illustrates a flow diagram of a process followed by an incremental learning engine for updating the database, in accordance with an embodiment.

Referring now to FIG. 12, a flow diagram of a process 1200 followed by an incremental learning engine for updating the database is illustrated, in accordance with an embodiment. In reference to FIG. 2, the incremental learning engine 214 of the AI model 104 may receive the feedback from the end-user depicted as a user feedback 1202 in present FIG. 12. In an embodiment, the incremental learning engine 214 may receive the user feedback 1202 for each of the set of errors represented as 'error 1204', the root cause associated with each of the set of errors represented as 'possible root cause 1206', and the set of possible solutions recommended for the root cause identified for each of the set of errors represented as 'recommended possible solutions 1208'.

In addition, the incremental learning engine 214 may receive the user feedback 1202 for the root cause associated with one of the one or more of the plurality of anomalies represented as 'root cause for anomalies 1210'. In an embodiment, the one of the one or more of the plurality of anomalies may correspond to the new or abnormal behavior that may not be an error. In other words, the one of the one or more of the plurality of anomalies may depict the new behavior for which the AI model 104 may not be trained initially.

In one embodiment, upon receiving the user feedback 1202 for the error 1204, the possible root cause 1206, and recommended possible solutions 1208, at step 1212, the incremental learning engine 214 may utilize the user feedback 1202 for training an AI learning engine. In reference to FIG. 2, the AI learning engine may correspond to the AI model 104. Once the training is performed for the AI learning engine, at step 1214, an error prediction module may be updated with the user feedback 1202 received for the error 1204, the possible root cause 1206, and recommended possible solutions 1208. In reference to FIG. 2, the error prediction module may correspond to the error prediction module 208.

In another embodiment, upon receiving the user feedback 1202 for the root cause for anomalies 1210, at step 1216, the incremental learning engine 214 may provide the user feedback 1202 to a configuration engine. The configuration engine may be configured to process the user feedback 1202 received for the root cause for anomalies 1210. Once the processing of the user feedback 1202 is performed by the configuration engine, at step 1218, the processed user feedback 1202 for the root cause for anomalies 1210 may be auto-deployed in the AI model 104 in order to update the AI model 104.

In yet another embodiment, a set of new log data files depicted as 'new log data files 1220' may be fed as an input to an incremental learning engine 1224. In this embodiment, the incremental learning engine 1224 may correspond to the incremental learning engine 214. Upon receiving the new log data files 1222, the incremental learning engine 1224 may be configured to detect the one or more of the plurality of anomalies present in the new log data files 1222. In present FIG. 12, the one or more of the plurality of anomalies present in the new log data files 1222 may be represented as 'anomalies 1226'. Once the anomalies 1226 are identified in the new log data files 1222, the anomalies 1226 may be auto-deployed in the AI model 104 in order to update the AI model 104.

Figure 13E:
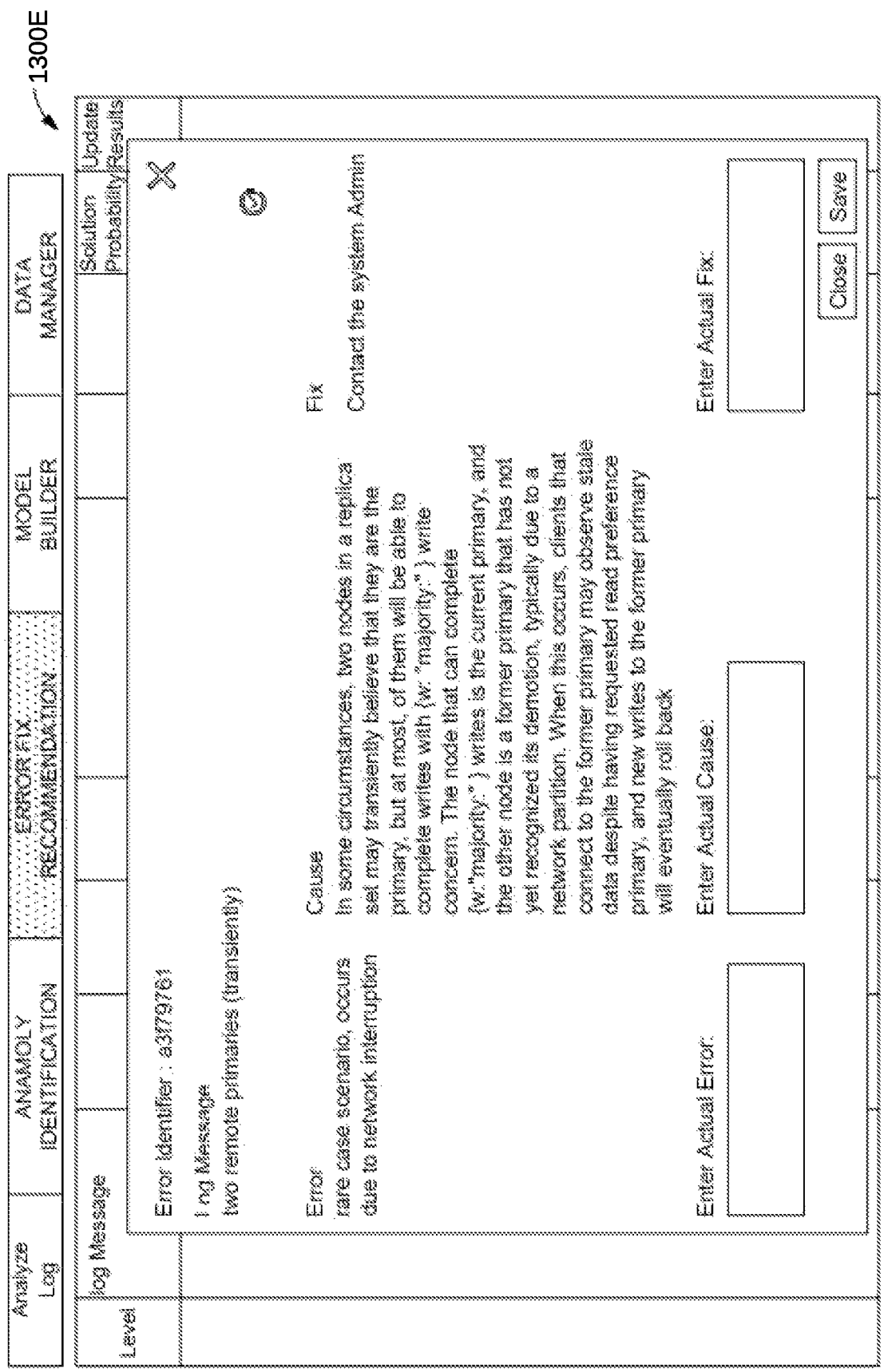

Referring now to FIGS. 13A-13E, an exemplary representation of the AI based log analyzer used to perform automatic analysis of log data files is illustrated, in accordance with an exemplary embodiment. In FIG. 13A, a screen capture 1300A of uploading the log data files is represented. In reference to FIG. 1, in order to upload the log data files, the end-user may login in the AI based log analyzer, i.e., the electronic device 102. The end-user may login in the AI based log analyzer using his user credentials. In an embodiment, the login credentials may include, but is not limited to, the username and the password. In reference to FIG. 4, the AI based log analyzer may correspond to the log analyzer 404.

As depicted in the present screen capture 1300A, the AI based log analyzer may correspond to a CPS—Log Analytics Tool. Once the user login in the AI based log analyzer, the end-user may select a first option, i.e., 'Analyze Log' option present on a menu bar. Once the end-user selects the 'Analyze Log' option, the end-user may upload desired log data files. It should be noted that, the end-user may upload multiple log data files for analysis at once. In order to upload the desired log data files, the end-user may select "Choose file" option and may then click on an "upload" button. Further, the uploaded desired log data files may be pre-processed to generate the transformed log data files.

Once the desired log data files are uploaded, an option may be provided to the end-user to select date by clicking on icon present in right hand side of "From" and "To" options. By way of an example, suppose the end-user may want to analyze the desired log data files from "20.01.2019" to "20.01.20". For this the end-user may enter starting date (i.e., 20 Jan. 2019) from which the desired log data files needs to be analyzed in "From" option. In addition, the end-user may enter last date (i.e., 20 Jan. 2020) till which the desired log data files may needed to be analyzed in "To" option. In other words, the end-user may optionally provide date time range when time of error occurred is known. Once the date time range is specified, the AI based log analyzer may filter the desired log data files in that specified date time range.

Once the starting date and the last date are selected, the end-user may click on an "Analyze Logs" button. Upon clicking on the "Analyze Logs" button, a table may be presented as depicted in the screen capture 1300A. the table may depict a first column of serial number of each of the desired log data files represented as, "S. No 1302A". A second column of the table may depict name of each of the desired log data files included in the desired log data file represented as "File name 1304A". A third column of the table may represent date of uploading each of the desired log data files represented as "Date Uploaded 1306A". A fourth column of the table may represent status of each of the desired log data files represented as "Status 1308A". A fifth column of the table may represent one or more of the plurality of anomalies identified in each of the desired log data files represented as "Anomaly Count 1310A". A sixth column of the table may represent the set of errors identified in each of the desired log data files represented as "Error Count 1312A".

Once the one or more of the plurality of anomalies and the set of errors are identified in each of the desired log data files, the AI based log analyzer may predict the root cause associated with each of the set of errors based on the one or more of the plurality of anomalies identified. Further, based on the predicted root cause, the AI based log analyzer may recommend the set of possible solution for each of the one or more of the plurality of anomalies detected. Based on the set of possible solution recommended for the one or more of the plurality of anomalies, the AI based log analyzer may generate the anomaly report as represented in a screen capture 1300B of FIG. 13B.

The screen capture 1300B represented in FIG. 13B may depict the report generated for each of the desired log data files in form of a table. A first column of the table may represent serial number associated with each of the one or more of the plurality of anomalies depicted as "S# 1302B". A second column of the table may represent level of each of the one or more of the plurality of anomalies depicted as "Level 1304B". A third column of the table may represent log message associated with each of the one or more of the plurality of anomalies depicted as "Log message 1306B". A fourth column of the table may represent the root cause associated with each of the one or more of the plurality of anomalies depicted as "Anomalies—Possible cause 1308B". A fifth column of the table may represent the set of possible solutions recommended for each of the one or more of the plurality of anomalies depicted as "Actions 1310B".

Further, the end-user may select first icon present in first row of the fifth column, i.e., first row in "Actions 13110B" in order to provide the feedback based on the recommended set of possible solutions. Upon clicking the first icon, a screen may be opened for capturing feedback from the end-user for first anomaly from the one or more of the plurality of anomalies detected. The screen opened for capturing the feedback for the first anomaly may be represented as a screen capture 1300C of FIG. 13C. As represented in the screen capture 1300C, the root cause represented as "possible cause" associated with the first anomaly is depicted on left hand side the screen capture 1300C.

Further, along with the depicted possible cause, an option may be provided to the end-user to provide the feedback by selecting one of two options, i.e., "Exclude data" option and "Mark it as Not Anomaly" option for the first anomaly. Similarly, the end-user may provide the feedback for each of the one or more of the plurality of anomalies.

The end-user may select "Exclude data" option for one of the one or more anomalies detected that may be anomaly, i.e., it may be an error or a false detection. Further, the end-user may select "Mark it as Not Anomaly" option for one of the one or more anomalies detected that may not correspond to the anomaly. Moreover, the end-user may save options selected for each of the one or more of the plurality of anomalies by clicking on "save button". Upon saving, the AI based Log analyzer may use above provided feedback information for performing incremental learning of an AI model. In reference to FIG. 1, the AI model may correspond to the AI model 104.

In FIG. 13D, a screen capture 1300D represents the report generated based on the predictive analysis performed for each of the one or more of the plurality of anomalies. In order to view the report generated based on the predictive analysis, the end-user may select third option, i.e., "Error Fix Recommendations" option from the menu bar. The report generated may be represented in form a table as depicted via screen capture 1300D. A first column of the table may represent level associated with each of the set of errors identified in the desired log data files represented as "Level 1302D". A second column of the table may represent log message associated with each of the set of errors identified in the desired log data files represented as "Log Message 1304D". A third column of the table may represent error component associated with each of the set of errors identified represented as "Error component 1306D".

A fourth column, i.e., of the table may represent one of the plurality of error categories predicted for each of the set of errors identified represented as "Predicted Error category 1308D". A fifth column of the table may represent the confidence score associated with each of the set of errors identified depicted as "Error Category Score 1310D". A sixth column of the table may represent the root cause associated with each of the set of errors represented as "Predicted Possible Cause 1312D". A seventh column of the table may represent the confidence score associated with the root cause predicted for each of the set of errors represented as "Possible Probability Score 1314D". An eighth column of the table may represent the set of possible solutions recommended for each of the set of errors represented as "Recommended Fix 1316D". A ninth column of the table may represent the confidence score associated with each of the set of possible solutions recommended for each of the set of errors represented as "Solution probability 1318D". A tenth column represented as "Update Results 1320D" of the table may provide an icon to be selected by the end-user for providing the feedback for each of the set of errors.

Upon selecting the icon provided in first row of the tenth column, i.e., first row of the "Update Results 1320D" column, a screen corresponding to first error from the set of errors may be opened and is represented by a screen capture 1300E of FIG. 13E. In order to provide the feedback for the first error, the first error depicted as "Error", the root cause associated with first error depicted as "Cause", and the set of solutions recommended for the first error depicted as "Fix" may be represented to the end-user. Based on the error, cause, and fix represented to the user, the end-user may perform one of the acceptance or rejection of the one of the set of possible solutions.

If the end user may perform rejection, as represented by the screen capture 1300E, the end user may need to enter an actual first error for the first error, an actual root cause associated with the first error, and an actual set of possible solutions that must be recommended for the first error. Once entered, entered the end-user may click on "save" button present on right hand side of the screen capture 1300E. Upon saving, the AI based Log analyzer may use above provided feedback information for performing the incremental learning of the AI model 104.

In order to perform incremental learning for the AI model, the end-user may select fourth option, i.e., "Model Builder" option present on the menu bar as represented in a screen capture 1300E of FIG. 13E. Upon selecting the "Model Builder" option, the end-user may upload log data files by clicking on "choose file" represented under 'Log Details' categories. Once uploaded, the end-user may select one option by clicking on one of three buttons, i.e., "Upload", "Self-Error Learning", and "Build Anomaly Model" based on his requirement. By way of an example, the user may select "Upload" button, to upload the log data files in order to be analyzed. Further, the user may select "Self-Error Learning" button for new log data files uploaded in order to allow the AI model to perform self-learning based on the new log data files provided as an input. Moreover, the third option, i.e., "Build Anomaly Model" button may be accessed by authorized end-users only. The authorized users may select the third option to train the AI model for one or more new anomalies.

Various embodiments provide method and system for automating analysis of log data files. The disclosed method and system may pre-process a log data file to generate a transformed log data file. The log data file includes a set of data files in one a plurality of data formats. Moreover, the disclosed method and system may analyze the transformed log data file to detect one or more of a plurality of anomalies in the transformed log data file. The one or more of the plurality of anomalies is detected by identifying one of a new and abnormal behavior associated with the transformed log data file. Additionally, the disclosed method and system may perform a predictive analysis for the one or more of the plurality of anomalies detected in the transformed log data file. The predictive analysis is performed based on a set of factors and a confidence score associated with each of the set of factors. Further, the disclosed method and system may generate a report based on the predictive analysis performed for each of the one or more of the plurality of anomalies. In addition, the disclosed method and system may receive a feedback from an end-user based on the report generated for each of the one or more of the plurality of anomalies. The end-user provides the feedback based on a pre-configured threshold value. Thereafter, the disclosed method and system may update a database based on the feedback from the end-user for each of the one or more of the plurality of anomalies.

The system and method provide some advantages like, the system and the method may analyze log data files by applying human intelligence to search for errors, anomalies, or suspicious or unauthorized activity that may deviate from existing flow of the log data files. In addition, the disclosed system and method may predict errors with the root cause associated with the errors. Based on the predicted errors and the root cause, the disclosed system and method may recommend the set of possible solutions to end-users. Further, the disclosed system and method may reduce bugs (i.e., the anomalies and the errors) analysis effort, thereby increasing productivity of the end-users. In addition, the disclosed system and method may reduce bandwidth and quick around time required for addressing critical bugs. Also, the disclosed system and method may provide on time delivery of the log data files. Lastly, the disclosed system and the method may reduce knowledge transition effort and Small to Medium Enterprise (SMEs) bandwidth.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for automating analysis of log data files, the method comprising:
   pre-processing, by an Artificial Intelligence (AI) model, a log data file to generate a transformed log data file, wherein the log data file comprises a set of data files in one of a plurality of data formats;
   analyzing, by the AI model, the transformed log data file to detect one or more of a plurality of anomalies in the transformed log data file, wherein the one or more of the plurality of anomalies is detected by identifying one of a new and abnormal behavior associated with the transformed log data file;
   performing, by the AI model, a predictive analysis for the one or more of the plurality of anomalies detected in the transformed log data file, wherein the predictive analysis is performed based on a set of factors and a separate confidence score associated with each of the set of factors;
   wherein performing the predictive analysis based on the set of factors and the confidence score associated with each of the set of factors comprises classifying each of a set of errors in one of the plurality of error categories, further comprising:
      categorizing, by the AI model, at least one of the set of errors in one of a pre-defined error categories; and generating, by the AI model, a new error category for at least one of the set of errors, wherein the new error category is generated upon identifying a new error from the set of errors, wherein the new error is absent in the pre-defined error categories; and wherein performing the predictive analysis based on the set of factors and the separate confidence score associated with each of the set of factors further comprises:

identifying, by the AI model, a set of errors in the transformed log data file based on the one or more of the plurality of anomalies detected in the transformed log data file;

classifying, by the AI model, each of the set of errors corresponding to the transformed log data file in one of a plurality of error categories;

identifying, by the AI model, a root cause associated with each of the set of errors identified corresponding to the transformed log data file;

recommending, by the AI model, a set of possible solutions based on the identified root cause for each of the set of errors; and generating, by the AI model, the separate confidence score for each of the set of errors, the root cause associated with each of the set of errors, and each of the set of possible solutions, p1 generating, by the AI model, a report based on the predictive analysis performed for each of the one or more of the plurality of anomalies;

receiving, by the AI model, a feedback from an end-user based on the report generated for each of the one or more of the plurality of anomalies, wherein the end-user provides the feedback based on a pre-configured threshold value; and updating, by the AI model, a database based on the feedback from the end-user for each of the one or more of the plurality of anomalies.

2. The method of claim 1, further comprising, uploading the log data file by the end-user, wherein the log data file is uploaded by the end-user using login credentials, and wherein the login credentials include a username and a password associated with the end-user.

3. The method of claim 1, wherein pre-processing the log data file to generate the transformed log data file comprises:

cleaning, by the AI model, junk data from the log data file to generate a clean log data file, wherein the clean log data file is generated by clustering each of a set of similar data files from the set of data files in one the plurality of data formats;

structuring, by the AI model, the clean log data file to generate a structured log data file, wherein the structured log data file is generated using a drain algorithm; and transforming, by the AI model, the structured log data file to generate the transformed log data file, wherein the transformed log data file corresponds to a clean and structured log data file.

4. The method of claim 1, wherein the set of factors include number of errors generated, category of each of the number of errors generated, root cause associated with each of the number of errors generated, and a set of possible solutions associated with each of the number of errors generated.

5. The method of claim 1, wherein receiving the feedback from the end-user comprises, performing, using the AI model, one of an acceptance or rejection of each of the set of possible solutions by the end-user based on the generated separate confidence score, wherein the acceptance or rejection of each of the set of possible solutions depends upon the pre-configured threshold value associated with each of the set of possible solutions.

6. The method of claim 1, wherein updating the database comprises, performing incremental learning, by the AI model, based on the feedback received from the end-user, wherein the incremental learning is performed based on the new error identified from the set of errors.

7. A system for automating analysis of log data files, the system comprising:

a processor; and a memory communicatively coupled to the processor, wherein the memory stores processor executable instructions, which, on execution, causes the processor to:

pre-process a log data file to generate a transformed log data file, wherein the log data file comprises a set of data files in one of a plurality of data formats;

analyze the transformed log data file to detect one or more of a plurality of anomalies in the transformed log data file, wherein the one or more of the plurality of anomalies is detected by identifying one of a new and abnormal behavior associated with the transformed log data file;

perform a predictive analysis for the one or more of the plurality of anomalies detected in the transformed log data file, wherein the predictive analysis is performed based on a set of factors and a separate confidence score associated with each of the set of factors;

wherein to perform the predictive analysis based on the set of factors and the separate confidence score associated with each of the set of factors, the processor executable instructions further cause the processor to classify each of the set of errors in one of the plurality of error categories, the processor executable instructions further cause the processor to:

categorize, by an AI model, at least one of the set of errors in one of a pre-defined error categories; and generate, by the AI model, a new error category for at least one of the set of errors, wherein the new error category is generated upon identifying a new error from the set of errors, wherein the new error is absent from the pre-defined error categories; and wherein performing the predictive analysis based on the set of factors and the separate confidence score associated with each of the set of factors comprises:

identifying, by the AI model, a set of errors in the transformed log data file based on the one or more of the plurality of anomalies detected in the transformed log data file;

classifying, by the AI model, each of the set of errors corresponding to the transformed log data file in one of a plurality of error categories;

identifying, by the AI model, a root cause associated with each of the set of errors identified corresponding to the transformed log data file;

recommending, by the AI model, a set of possible solutions based on the identified root cause for each of the set of errors;

generating, by the AI model, the separate confidence score for each of the set of errors, the root cause associated with each of the set of errors, and each of the set of possible solutions; and generate a report based on the predictive analysis performed for each of the one or more of the plurality of anomalies;

receive a feedback from an end-user based on the report generated for each of the one or more of the plurality of anomalies, wherein the end-user provides the feedback based on a pre-configured threshold value; and update a database based on the feedback from the end-user for each of the one or more of the plurality of anomalies.

8. The system of claim 7, wherein the processor executable instructions cause the processor to upload the log data file by the end-user, wherein the log data file is uploaded by the end-user using login credentials, and wherein the login credentials include a username and a password associated with the end-user.

9. The system of claim 7, wherein, to pre-process the log data file to generate the transformed log data file, the processor executable instructions further cause the processor to:

clean junk data from the log data file to generate a clean log data file, wherein the clean log data file is generated by clustering each of a set of similar data files from the set of data files in one the plurality of data formats;

structure the clean log data file to generate a structured log data file, wherein the structured log data file is generated using a drain algorithm; and transform the structured log data file to generate the transformed log data file, wherein the transformed log data file corresponds to a clean and structured log data file.

10. The system of claim 7, wherein the set of factors include number of errors generated, category of each of the number of errors generated, root cause associated with each of the number of errors generated, and a set of possible solutions associated with each of the number of errors generated.

11. The system of claim 10, wherein, to receive the feedback from the end-user, the processor executable instructions further cause the processor to perform one of an acceptance or rejection of each of the set of possible solutions by the end-user based on the generated separate confidence score, wherein the acceptance or rejection of each of the set of possible solutions depends upon the pre-configured threshold value associated with each of the set of possible solutions.

12. The system of claim 10, wherein, to update the database, the processor executable instructions further cause the processor to perform incremental learning based on the feedback received from the end-user, wherein the incremental learning is performed based on the new error identified from the set of errors.

13. A non-transitory computer-readable medium storing computer-executable instructions for automating analysis of log data files, the stored instructions, when executed by a processor, cause the processor to perform operations comprises:

pre-processing a log data file to generate a transformed log data file, wherein the log data file comprises a set of data files in one of a plurality of data formats;

analyzing the transformed log data file to detect one or more of a plurality of anomalies in the transformed log data file, wherein the one or more of the plurality of anomalies is detected by identifying one of a new and abnormal behavior associated with the transformed log data file;

performing a predictive analysis for the one or more of the plurality of anomalies detected in the transformed log data file, wherein the predictive analysis is performed based on a set of factors and a separate confidence score associated with each of the set of factors;

wherein performing the predictive analysis based on the set of factors and the separate confidence score associated with each of the set of factors comprises classifying each of the set of errors in one of the plurality of error categories, further comprising:

categorizing, by an AI model, at least one of the set of errors in one of a pre-defined error categories; and generating, by the AI model, a new error category for at least one of the set of errors, wherein the new error category is generated upon identifying a new error from the set of errors, wherein the new error is absent in the pre-defined error categories; and wherein performing the predictive analysis based on the set of factors and the separate confidence score associated with each of the set of factors comprises:

identifying, by the AI model, a set of errors in the transformed log data file based on the one or more of the plurality of anomalies detected in the transformed log data file;

classifying, by the AI model, each of the set of errors corresponding to the transformed log data file in one of a plurality of error categories;

identifying, by the AI model, a root cause associated with each of the set of errors identified corresponding to the transformed log data file;

recommending, by the AI model, a set of possible solutions based on the identified root cause for each of the set of errors;

generating, by the AI model, the separate confidence score for each of the set of errors, the root cause associated with each of the set of errors, and each of the set of possible solutions; and generating a report based on the predictive analysis performed for each of the one or more of the plurality of anomalies;

receiving a feedback from an end-user based on the report generated for each of the one or more of the plurality of anomalies, wherein the end-user provides the feedback based on a pre-configured threshold value; and updating a database based on the feedback from the end-user for each of the one or more of the plurality of anomalies.

* * * * *